US008532999B2

(12) United States Patent
Neusinger et al.

(10) Patent No.: US 8,532,999 B2
(45) Date of Patent: Sep. 10, 2013

(54) APPARATUS AND METHOD FOR GENERATING A MULTI-CHANNEL SYNTHESIZER CONTROL SIGNAL, MULTI-CHANNEL SYNTHESIZER, METHOD OF GENERATING AN OUTPUT SIGNAL FROM AN INPUT SIGNAL AND MACHINE-READABLE STORAGE MEDIUM

(75) Inventors: Matthias Neusinger, Rohr (DE); Juergen Herre, Buckenhof (DE); Sascha Disch, Fuerth (DE); Heiko Purnhagen, Sundbyberg (SE); Kristofer Kjoerling, Solna (SE); Jonas Engdegard, Stockholm (SE); Jeroen Breebaart, Eindhoven (NL); Erik Schuijers, Eindhoven (NL); Werner Oomen, Eindhoven (NL)

(73) Assignees: Fraunhofer-Gesellschaft zur Forderung der Angewandten Forschung E.V., Munich (DE); Dolby International AB, Amsterdam Zuid-Oost (NL); Koninklijke Philips Electronics N.V., Eindhoven (NL)

( * ) Notice: Subject to any disclaimer, the term of this patent is extended or adjusted under 35 U.S.C. 154(b) by 69 days.

(21) Appl. No.: 13/158,863

(22) Filed: Jun. 13, 2011

(65) Prior Publication Data

US 2011/0235810 A1 Sep. 29, 2011

Related U.S. Application Data

(62) Division of application No. 11/212,395, filed on Aug. 25, 2005, now Pat. No. 7,983,922.

(60) Provisional application No. 60/671,582, filed on Apr. 15, 2005.

(51) Int. Cl.

| | |
|---|---|
| ***G10L 19/14*** | (2006.01) |
| ***G10L 21/02*** | (2006.01) |
| ***G06F 15/00*** | (2006.01) |
| *G10L 11/00* | (2006.01) |
| *G10L 11/02* | (2006.01) |

(52) U.S. Cl.
USPC ............................ 704/500; 704/501; 704/200

(58) Field of Classification Search
USPC ................. 704/200–201, 500–501, 503–504, 704/E19.001–E19.049
See application file for complete search history.

(56) References Cited

U.S. PATENT DOCUMENTS

| | | | | |
|---|---|---|---|---|
| 5,001,650 | A * | 3/1991 | Francis et al. | 348/169 |
| 5,267,317 | A * | 11/1993 | Kleijn | 704/217 |
| 5,432,884 | A * | 7/1995 | Kapanen et al. | 704/228 |
| 5,579,430 | A | 11/1996 | Grill et al. | |
| 5,664,055 | A * | 9/1997 | Kroon | 704/223 |
| 5,701,346 | A | 12/1997 | Herre et al. | |
| 5,703,999 | A | 12/1997 | Herre et al. | |
| 5,706,309 | A | 1/1998 | Eberlein et al. | |
| 5,812,971 | A | 9/1998 | Herre | |
| 5,815,117 | A * | 9/1998 | Kolanek | 342/442 |
| 5,890,125 | A | 3/1999 | Davis et al. | |
| 6,104,992 | A * | 8/2000 | Gao et al. | 704/220 |
| 6,249,758 | B1 * | 6/2001 | Mermelstein | 704/220 |
| 6,374,211 | B2 * | 4/2002 | Stegmann et al. | 704/211 |
| 6,421,454 | B1 * | 7/2002 | Burke et al. | 382/131 |
| 6,611,797 | B1 | 8/2003 | Amada et al. | |
| 6,708,145 | B1 * | 3/2004 | Liljeryd et al. | 704/200.1 |
| 6,718,309 | B1 * | 4/2004 | Selly | 704/503 |
| 7,003,467 | B1 | 2/2006 | Smith et al. | |
| 7,382,886 | B2 | 6/2008 | Henn et al. | |
| 7,391,870 | B2 * | 6/2008 | Herre et al. | 381/23 |
| 7,394,903 | B2 * | 7/2008 | Herre et al. | 381/23 |
| 7,742,912 | B2 * | 6/2010 | Den Brinker | 704/200.1 |
| 7,983,922 | B2 * | 7/2011 | Neusinger et al. | 704/500 |
| 8,014,534 | B2 * | 9/2011 | Henn et al. | 381/23 |
| RE43,189 | E * | 2/2012 | Liljeryd et al. | 704/200.1 |
| 2003/0026441 | A1 | 2/2003 | Faller | |
| 2003/0035553 | A1 | 2/2003 | Baumgarte et al. | |
| 2003/0115050 | A1 * | 6/2003 | Chen et al. | 704/230 |
| 2003/0219130 | A1 | 11/2003 | Baumgarte et al. | |
| 2004/0044527 | A1 | 3/2004 | Thumpudi et al. | |
| 2004/0088169 | A1 * | 5/2004 | Smith et al. | 704/500 |
| 2005/0015259 | A1 * | 1/2005 | Thumpudi et al. | 704/500 |

| | | | | | |
|---|---|---|---|---|---|
| 2005/0053242 | A1 * | 3/2005 | Henn et al. | 381/22 |
| 2005/0060142 | A1 * | 3/2005 | Visser et al. | 704/201 |
| 2005/0157883 | A1 * | 7/2005 | Herre et al. | 381/17 |
| 2006/0004583 | A1 | 1/2006 | Herre et al. | |
| 2006/0009225 | A1 * | 1/2006 | Herre et al. | 455/450 |
| 2006/0246868 | A1 | 11/2006 | Taleb et al. | |
| 2007/0140499 | A1 * | 6/2007 | Davis | 381/23 |
| 2007/0236858 | A1 * | 10/2007 | Disch et al. | 361/272 |
| 2007/0248157 | A1 * | 10/2007 | Den Brinker | 375/240 |
| 2008/0002842 | A1 * | 1/2008 | Neusinger et al. | 381/119 |
| 2008/0031463 | A1 | 2/2008 | Davis | |
| 2010/0046762 | A1 | 2/2010 | Henn et al. | |
| 2011/0235810 | A1 * | 9/2011 | Neusinger et al. | 381/23 |
| 2012/0243690 | A1 * | 9/2012 | Engdegard et al. | 381/22 |

FOREIGN PATENT DOCUMENTS

| | | | |
|---|---|---|---|
| CA | 2556575 | A1 | 9/2005 |
| CN | 1575621 | A | 2/2005 |
| JP | 10051313 | A | 2/1998 |
| JP | 2001510953 | T | 8/2001 |
| JP | 2004226993 | A | 8/2004 |
| JP | 2004535145 | T | 11/2004 |
| RU | 2119259 | C1 | 9/1998 |
| RU | 2129336 | C1 | 4/1999 |
| RU | 2141166 | C1 | 11/1999 |
| TW | 00313362 | | 8/1997 |
| WO | 9526083 | A1 | 9/1995 |
| WO | 0232186 | A2 | 4/2002 |
| WO | 03007656 | A1 | 1/2003 |
| WO | 2005086139 | A1 | 9/2005 |

OTHER PUBLICATIONS

Institute of Acoustics: "Nominations Invited for the Institute of Acoustics", 2006 A B Wood Medal, www.ioa.org.uk.
Yang et al., Advanced Video Technologies and Applications for H.264/AVC and Beyond, Eurasip Journal on Applied Signal Processing, Hindawi Publishing Corporation, publication date 3rd Quarter, 2006, www.hindawi.com.
Makeig et al., "Advances in Blind Source Separation", Eurasip Journal on Applied Signal Processing, Hindawi Publishing Corporation, publication date 3rd Quarter, 2006, www.hindawi.com.
Verly et al., "Tracking in Video Sequences of Crowded Scenes", Eurasip Journal on Applied Signal Processing, Hindawi Publishing Corporation, publication date 3rd Quarter, 2006, www.hindawi.com.
Berberidis et al., "Advances in Subspace-Based Techniques for Signal Processing and Comminications", Eurasip Journal on Applied Signal Processing, Hindawi Publishing Corporation, publication date 3rd Quarter, 2006, www.hindawi.com.
Fujinaga et al., "Music Information Retrival Based on Signal Processing", Eurasip Journal on Applied Signal Processing, Hindawi Publishing Corporation, publication date 3rd Quarter, 2006, www.hindawi.com.
Kundur et al., "Visual Sensor Networks", Eurasip Journal on Applied Signal Processing, Hindawi Publishing Corporation, publication date 3rd Quarter, 2006, www.hindawi.com.
Lin et al., "Multirate Systems and Applications", Eurasip Journal on Applied Signal Processing, Hindawi Publishing Corporation, publication date 4th Quarter, 2006, www.hindawi.com.
Chi et al., "Multisensor Processing for Signal Extraction and Applications", Eurasip Journal on Applied Signal Processing, Hindawi Publishing Corporation, publication date 4th Quarter, 2006, www.hindawi.com.
Chen et al., "Search and Retrieval of 3D Content and Associated Knowledge Extraction and Propagation", Eurasip Journal on Applied Signal Processing, Hindawi Publishing Corporation, publication date 4th Quarter, 2006, www.hindawi.com.
Rupp et al., "Signal Processing with High Complexity: Prototyping and Industrial Design", Eurasip Journal on Embedded Systems, Hindawi Publishing Corporation, publication date 3rd Quarter, 2006, www.hindawi.com.
Leeser et al., "Field-Programmable Gate Arrays in Embedded Systems", Eurasip Journal on Embedded Systems, Hindawi Publishing Corporation, publication date 4th Quarter, 2006, www.hindawi.com.
Girault et al., "Synchronous Paradigm in Embedded Systems", Eurasip Journal on Embedded Systems, Hindawi Publishing Corporation, publication date 1st Quarter, 2007, www.hindawi.com.
Herre et al., "Intensity Stereo Coding", Presented at the 96th Convention, Feb. 26-Mar. 1, 1994, Amsterdam.
Faller et al., "Binaural Cue Coding Applied to Stereo and Multi-Channel Audio Compression", Convention Paper 5574, presented at the 112th Convention, May 10-13, 2002 Munich, Germany.
Breebaart et al., "High-Quality Parametric Spatial Audio Coding at Low Bitrates", Convention Paper 6072, presented at the 116th Convention, May 8-11, 2004 Berlin, Germany.
Schuijers et al., "Low Complexity Parametric Stereo Coding", Convention Paper 6073, presented at the 116th Convention, May 8-11, 2004 Berlin, Germany.
Breebaart et al., "Parametric Coding of Stereo Audio", Eurasip Journal on Applied Signal Processing 2005.
Faller et al., "Binaural Cue Coding", Part II: Schemes and Applications, IEEE Transactions on Speech and Audio Processing, vol. XX, No. Y, 2002.
Special Issue on "Image Perception", Eurasip Journal on Applied Processing, published in the 3rd Quarter, 2006, Hindawi Publishing Corporation, http://www.hindawi.com.

* cited by examiner

*Primary Examiner* — Pierre-Louis Desir
*Assistant Examiner* — David Kovacek
(74) *Attorney, Agent, or Firm* — Laurence A. Greenberg; Werner H. Stemer; Ralph E. Locher

(57) ABSTRACT

An apparatus and a method for generating a multi-channel synthesizer control signal, a multi-channel synthesizer, a method of generating an output signal from an input signal and a machine-readable storage medium are provided. On an encoder-side, a multi-channel input signal is analyzed for obtaining smoothing control information, which is to be used by a decoder-side multi-channel synthesis for smoothing quantized transmitted parameters or values derived from the quantized transmitted parameters for providing an improved subjective audio quality in particular for slowly moving point sources and rapidly moving point sources having tonal material such as fast moving sinusoids.

20 Claims, 17 Drawing Sheets

Spatial Position $$p = \frac{L.\ e_L + C.\ e_c + R.\ e_R + Ls.\ e_{LS} + Rs.\ e_{Rs}}{L + C + R + Ls + Rs}$$

APPARATUS AND METHOD FOR GENERATING A MULTI-CHANNEL SYNTHESIZER CONTROL SIGNAL, MULTI-CHANNEL SYNTHESIZER, METHOD OF GENERATING AN OUTPUT SIGNAL FROM AN INPUT SIGNAL AND MACHINE-READABLE STORAGE MEDIUM

CROSS-REFERENCE TO RELATED APPLICATION

This is a divisional of application Ser. No. 11/212,395, filed Aug. 25, 2005; the application also claims the priority benefit under 35 U.S.C. §119 (e), of copending U.S. Provisional Application No. 60/671,582, filed Apr. 15, 2005; the prior applications are herewith incorporated by reference in their entirety.

BACKGROUND OF THE INVENTION

Field of the Invention

The present invention relates to a multi-channel audio processing and, in particular, to multi-channel encoding and synthesizing using parametric side information.

In recent times, multi-channel audio reproduction techniques are becoming more and more popular. This may be due to the fact that audio compression/encoding techniques such as the well-known MPEG-1 layer 3 (also known as mp3) technique have made it possible to distribute audio contents via the Internet or other transmission channels having a limited bandwidth.

A further reason for this popularity is the increased availability of multi-channel content and the increased penetration of multi-channel playback devices in the home environment.

The mp3 coding technique has become so famous because of the fact that it allows distribution of all the records in a stereo format, i.e., a digital representation of the audio record including a first or left stereo channel and a second or right stereo channel. Furthermore, the mp3 technique created new possibilities for audio distribution given the available storage and transmission bandwidths Nevertheless, there are basic shortcomings of conventional two-channel sound systems. They result in a limited spatial imaging due to the fact that only two loudspeakers are used. Therefore, surround techniques have been developed. A recommended multi-channel-surround representation includes, in addition to the two stereo channels L and R, an additional center channel C, two surround channels Ls, Rs and optionally a low frequency enhancement channel or sub-woofer channel. This reference sound format is also referred to as three/two-stereo (or 5.1 format), which means three front channels and two surround channels. Generally, five transmission channels are required. In a playback environment, at least five speakers at the respective five different places are needed to get an optimum sweet spot at a certain distance from the five well-placed loudspeakers.

Several techniques are known in the art for reducing the amount of data required for transmission of a multi-channel audio signal. Such techniques are called joint stereo techniques. To this end, reference is made to FIG. 10, which shows a joint stereo device 60. This device can be a device implementing e.g. intensity stereo (IS), parametric stereo (PS) or (a related) binaural cue coding (BCC). Such a device generally receives—as an input—at least two channels (CH1, CH2, . . . CHn), and outputs a single carrier channel and parametric data. The parametric data are defined such that, in a decoder, an approximation of an original channel (CH1, CH2, . . . CHn) can be calculated.

Normally, the carrier channel will include subband samples, spectral coefficients, time domain samples etc, which provide a comparatively fine representation of the underlying signal, while the parametric data does not include such samples of spectral coefficients but include control parameters for controlling a certain reconstruction algorithm such as weighting by multiplication, time shifting, frequency shifting, phase shifting. The parametric data, therefore, include only a comparatively coarse representation of the signal of the associated channel. Stated in numbers, the amount of data required by a carrier channel encoded using a conventional lossy audio coder will be in the range of 60-70 kBit/s, while the amount of data required by parametric side information for one channel will be in the range of 1.5-2.5 kBit/s. An example for parametric data are the well-known scale factors, intensity stereo information or binaural cue parameters as will be described below.

Intensity stereo coding is described in AES preprint 3799, "Intensity Stereo Coding", J. Herre, K. H. Brandenburg, D. Lederer, at $96^{th}$ AES, February 1994, Amsterdam. Generally, the concept of intensity stereo is based on a main axis transform to be applied to the data of both stereophonic audio channels. If most of the data points are concentrated around the first principle axis, a coding gain can be achieved by rotating both signals by a certain angle prior to coding and excluding the second orthogonal component from transmission in the bit stream. The reconstructed signals for the left and right channels consist of differently weighted or scaled versions of the same transmitted signal. Nevertheless, the reconstructed signals differ in their amplitude but are identical regarding their phase information. The energy-time envelopes of both original audio channels, however, are preserved by means of the selective scaling operation, which typically operates in a frequency selective manner. This conforms to the human perception of sound at high frequencies, where the dominant spatial cues are determined by the energy envelopes.

Additionally, in practical implementations, the transmitted signal, i.e. the carrier channel is generated from the sum signal of the left channel and the right channel instead of rotating both components. Furthermore, this processing, i.e., generating intensity stereo parameters for performing the scaling operation, is performed frequency selective, i.e., independently for each scale factor band, i.e., encoder frequency partition. Preferably, both channels are combined to form a combined or "carrier" channel, and, in addition to the combined channel, the intensity stereo information is determined which depend on the energy of the first channel, the energy of the second channel or the energy of the combined channel.

The BCC technique is described in AES convention paper 5574, "Binaural cue coding applied to stereo and multi-channel audio compression", C. Faller, F. Baumgarte, May 2002, Munich. In BCC encoding, a number of audio input channels are converted to a spectral representation using a DFT based transform with overlapping windows. The resulting uniform spectrum is divided into non-overlapping partitions each having an index. Each partition has a bandwidth proportional to the equivalent rectangular bandwidth (ERB). The inter-channel level differences (ICLD) and the inter-channel time differences (ICTD) are estimated for each partition for each frame k. The ICLD and ICTD are quantized and coded resulting in a BCC bit stream. The inter-channel level differences and inter-channel time differences are given for each channel relative to a reference channel. Then, the parameters are calculated in accordance with prescribed formulae, which depend on the certain partitions of the signal to be processed.

At a decoder-side, the decoder receives a mono signal and the BCC bit stream. The mono signal is transformed into the frequency domain and input into a spatial synthesis block, which also receives decoded ICLD and ICTD values. In the spatial synthesis block, the BCC parameters (ICLD and ICTD) values are used to perform a weighting operation of the mono signal in order to synthesize the multi-channel signals, which, after a frequency/time conversion, represent a reconstruction of the original multi-channel audio signal.

In case of BCC, the joint stereo module 60 is operative to output the channel side information such that the parametric channel data are quantized and encoded ICLD or ICTD parameters, wherein one of the original channels is used as the reference channel for coding the channel side information.

Typically, in the most simple embodiment, the carrier channel is formed of the sum of the participating original channels.

Naturally, the above techniques only provide a mono representation for a decoder, which can only process the carrier channel, but is not able to process the parametric data for generating one or more approximations of more than one input channel.

The audio coding technique known as binaural cue coding (BCC) is also well described in the United States patent application publications US 2003, 0219130 A1, 2003/0026441 A1 and 2003/0035553 A1. Additional reference is also made to "Binaural Cue Coding. Part II: Schemes and Applications", C. Faller and F. Baumgarte, IEEE Trans. On Audio and Speech Proc., Vol. 11, No. 6, November 2003. The cited United States patent application publications and the two cited technical publications on the BCC technique authored by Faller and Baumgarte are incorporated herein by reference in their entireties.

Significant improvements of binaural cue coding schemes that make parametric schemes applicable to a much wider bit-rate range are known as 'parametric stereo' (PS), such as standardized in MPEG-4 high-efficiency AAC v2. One of the important extensions of parametric stereo is the inclusion of a spatial 'diffuseness' parameter. This percept is captured in the mathematical property of inter-channel correlation or inter-channel coherence (ICC). The analysis, perceptual quantization, transmission and synthesis processes of PS parameters are described in detail in "Parametric coding of stereo audio", J. Breebaart, S. van de Par, A. Kohlrausch and E. Schuijers, EURASIP J. Appl. Sign. Proc. 2005:9, 1305-1322. Further reference is made to J. Breebaart, S. van de Par, A. Kohlrausch, E. Schuijers, "High-Quality Parametric Spatial Audio Coding at Low Bitrates", AES 116$^{th}$ Convention, Berlin, Preprint 6072, May 2004, and E. Schuijers, J. Breebaart, H. Purnhagen, J. Engdegard, "Low Complexity Parametric Stereo Coding", AES 116$^{th}$ Convention, Berlin, Preprint 6073, May 2004.

In the following, a typical generic BCC scheme for multi-channel audio coding is elaborated in more detail with reference to FIGS. 11 to 13. FIG. 11 shows such a generic binaural cue coding scheme for coding/transmission of multi-channel audio signals. The multi-channel audio input signal at an input 110 of a BCC encoder 112 is down mixed in a down mix block 114. In the present example, the original multi-channel signal at the input 110 is a 5-channel surround signal having a front left channel, a front right channel, a left surround channel, a right surround channel and a center channel. In a preferred embodiment of the present invention, the down mix block 114 produces a sum signal by a simple addition of these five channels into a mono signal. Other down mixing schemes are known in the art such that, using a multi-channel input signal, a down mix signal having a single channel can be obtained. This single channel is output at a sum signal line 115. A side information obtained by a BCC analysis block 116 is output at a side information line 117. In the BCC analysis block, inter-channel level differences (ICLD), and inter-channel time differences (ICTD) are calculated as has been outlined above. Recently, the BCC analysis block 116 has inherited Parametric Stereo parameters in the form of inter-channel correlation values (ICC values). The sum signal and the side information is transmitted, preferably in a quantized and encoded form, to a BCC decoder 120. The BCC decoder decomposes the transmitted sum signal into a number of subbands and applies scaling, delays and other processing to generate the subbands of the output multi-channel audio signals. This processing is performed such that ICLD, ICTD and ICC parameters (cues) of a reconstructed multi-channel signal at an output 121 are similar to the respective cues for the original multi-channel signal at the input 110 into the BCC encoder 112. To this end, the BCC decoder 120 includes a BCC synthesis block 122 and a side information processing block 123.

In the following, the internal construction of the BCC synthesis block 122 is explained with reference to FIG. 12. The sum signal on line 115 is input into a time/frequency conversion unit or filter bank FB 125. At the output of block 125, there exists a number N of sub band signals or, in an extreme case, a block of a spectral coefficients, when the audio filter bank 125 performs a 1:1 transform, i.e., a transform which produces N spectral coefficients from N time domain samples.

The BCC synthesis block 122 further comprises a delay stage 126, a level modification stage 127, a correlation processing stage 128 and an inverse filter bank stage IFB 129. At the output of stage 129, the reconstructed multi-channel audio signal having for example five channels in case of a 5-channel surround system, can be output to a set of loudspeakers 124 as illustrated in FIG. 11.

As shown in FIG. 12, the input signal s(n) is converted into the frequency domain or filter bank domain by means of element 125. The signal output by element 125 is multiplied such that several versions of the same signal are obtained as illustrated by multiplication node 130. The number of versions of the original signal is equal to the number of output channels in the output signal. to be reconstructed When, in general, each version of the original signal at node 130 is subjected to a certain delay $d_1, d_2, \ldots, d_i, d_N$. The delay parameters are computed by the side information processing block 123 in FIG. 11 and are derived from the inter-channel time differences as determined by the BCC analysis block 116.

The same is true for the multiplication parameters $a_1, a_2, \ldots, a_i, \ldots, a_N$, which are also calculated by the side information processing block 123 based on the inter-channel level differences as calculated by the BCC analysis block 116.

The ICC parameters calculated by the BCC analysis block 116 are used for controlling the functionality of block 128 such that certain correlations between the delayed and level-manipulated signals are obtained at the outputs of block 128. It is to be noted here that the ordering of the stages 126, 127, 128 may be different from the case shown in FIG. 12.

It is to be noted here that, in a frame-wise processing of an audio signal, the BCC analysis is performed frame-wise, i.e. time-varying, and also frequency-wise. This means that, for each spectral band, the BCC parameters are obtained. This means that, in case the audio filter bank 125 decomposes the input signal into for example 32 band pass signals, the BCC analysis block obtains a set of BCC parameters for each of the 32 bands. Naturally the BCC synthesis block 122 from FIG. 11, which is shown in detail in FIG. 12, performs a reconstruction that is also based on the 32 bands in the example.

In the following, reference is made to FIG. 13 showing a setup to determine certain BCC parameters. Normally, ICLD, ICTD and ICC parameters can be defined between pairs of channels. However, it is preferred to determine ICLD and ICTD parameters between a reference channel and each other channel. This is illustrated in FIG. 13A.

ICC parameters can be defined in different ways. Most generally, one could estimate ICC parameters in the encoder between all possible channel pairs as indicated in FIG. 13B. In this case, a decoder would synthesize ICC such that it is approximately the same as in the original multi-channel signal between all possible channel pairs. It was, however, proposed to estimate only ICC parameters between the strongest two channels at each time. This scheme is illustrated in FIG. 13C, where an example is shown, in which at one time instance, an ICC parameter is estimated between channels 1 and 2, and, at another time instance, an ICC parameter is calculated between channels 1 and 5. The decoder then synthesizes the inter-channel correlation between the strongest channels in the decoder and applies some heuristic rule for computing and synthesizing the inter-channel coherence for the remaining channel pairs.

Regarding the calculation of, for example, the multiplication parameters $a_1$, $a_N$ based on transmitted ICLD parameters, reference is made to AES convention paper 5574 cited above. The ICLD parameters represent an energy distribution in an original multi-channel signal. Without loss of generality, it is shown in FIG. 13A that there are four ICLD parameters showing the energy difference between all other channels and the front left channel. In the side information processing block 123, the multiplication parameters $a_1, \ldots, a_N$ are derived from the ICLD parameters such that the total energy of all reconstructed output channels is the same as (or proportional to) the energy of the transmitted sum signal. A simple way for determining these parameters is a 2-stage process, in which, in a first stage, the multiplication factor for the left front channel is set to unity, while multiplication factors for the other channels in FIG. 13A are set to the transmitted ICLD values. Then, in a second stage, the energy of all five channels is calculated and compared to the energy of the transmitted sum signal. Then, all channels are downscaled using a downscaling factor that is equal for all channels, wherein the downscaling factor is selected such that the total energy of all reconstructed output channels is, after downscaling, equal to the total energy of the transmitted sum signal.

Naturally, there are other methods for calculating the multiplication factors, which do not rely on the 2-stage process but which only need a 1-stage process. A 1-stage method is described in AES preprint "The reference model architecture for MPEG spatial audio coding", J. Herre et al., 2005, Barcelona.

Regarding the delay parameters, it is to be noted that the delay parameters ICTD, which are transmitted from a BCC encoder can be used directly, when the delay parameter $d_1$ for the left front channel is set to zero. No rescaling has to be done here, since a delay does not alter the energy of the signal.

Regarding the inter-channel coherence measure ICC transmitted from the BCC encoder to the BCC decoder, it is to be noted here that a coherence manipulation can be done by modifying the multiplication factors $a_1, \ldots, a_n$ such as by multiplying the weighting factors of all subbands with random numbers with values between 20 log 10(−6) and 20 log 10(6). The pseudo-random sequence is preferably chosen such that the variance is approximately constant for all critical bands, and the average is zero within each critical band. The same sequence is applied to the spectral coefficients for each different frame. Thus, the auditory image width is controlled by modifying the variance of the pseudo-random sequence. A larger variance creates a larger image width. The variance modification can be performed in individual bands that are critical-band wide. This enables the simultaneous existence of multiple objects in an auditory scene, each object having a different image width. A suitable amplitude distribution for the pseudo-random sequence is a uniform distribution on a logarithmic scale as it is outlined in the US patent application publication 2003/0219130 A1. Nevertheless, all BCC synthesis processing is related to a single input channel transmitted as the sum signal from the BCC encoder to the BCC decoder as shown in FIG. 11.

As has been outlined above with respect to FIG. 13, the parametric side information, i.e., the interchannel level differences (ICLD), the interchannel time differences (ICTD) or the interchannel coherence parameter (ICC) can be calculated and transmitted for each of the five channels. This means that one, normally, transmits five sets of interchannel level differences for a five-channel signal. The same is true for the interchannel time differences. With respect to the inter-channel coherence parameter, it can also be sufficient to only transmit for example two sets of these parameters.

As has been outlined above with respect to FIG. 12, there is not a single level difference parameter, time difference parameter or coherence parameter for one frame or time portion of a signal. Instead, these parameters are determined for several different frequency bands so that a frequency-dependent parameterisation is obtained. Since it is preferred to use for example 32 frequency channels, i.e., a filter bank having 32 frequency bands for BCC analysis and BCC synthesis, the parameters can occupy quite a lot of data. Although—compared to other multi-channel transmissions—the parametric representation results in a quite low data rate, there is a continuing need for further reduction of the necessary data rate for representing a multi-channel signal such as a signal having two channels (stereo signal) or a signal having more than two channels such as a multi-channel surround signal.

To this end, the encoder-side calculated reconstruction parameters are quantized in accordance with a certain quantization rule. This means that unquantized reconstruction parameters are mapped onto a limited set of quantization levels or quantization indices as it is known in the art and described specifically for parametric coding in detail in "Parametric coding of stereo audio", J. Breebaart, S. van de Par, A. Kohlrausch and E. Schuijers, EURASIP J. Appl. Sign. Proc. 2005:9, 1305-1322. and in C. Faller and F. Baumgarte, "Binaural cue coding applied to audio compression with flexible rendering," AES 113$^{th}$ Convention, Los Angeles, Preprint 5686, October 2002.

Quantization has the effect that all parameter values, which are smaller than the quantization step size, are quantized to zero, depending on whether the quantizer is of the mid-tread or mid-riser type. By mapping a large set of unquantized values to a small set of quantized values additional data saving are obtained. These data rate savings are further enhanced by entropy-encoding the quantized reconstruction parameters on the encoder-side. Preferred entropy-encoding methods are Huffman methods based on predefined code tables or based on an actual determination of signal statistics and signal-adaptive construction of codebooks. Alternatively, other entropy-encoding tools can be used such as arithmetic encoding.

Generally, one has the rule that the data rate required for the reconstruction parameters decreases with increasing quantizer step size. Differently stated, a coarser quantization results in a lower data rate, and a finer quantization results in a higher data rate.

Since parametric signal representations are normally required for low data rate environments, one tries to quantize the reconstruction parameters as coarse as possible to obtain a signal representation having a certain amount of data in the base channel, and also having a reasonable small amount of data for the side information which include the quantized and entropy-encoded reconstruction parameters.

Prior art methods, therefore, derive the reconstruction parameters to be transmitted directly from the multi-channel signal to be encoded. A coarse quantization as discussed above results in reconstruction parameter distortions, which result in large rounding errors, when the quantized reconstruction parameter is inversely quantized in a decoder and used for multi-channel synthesis. Naturally, the rounding error increases with the quantizer step size, i.e., with the selected "quantizer coarseness". Such rounding errors may result in a quantization level change, i.e., in a change from a first quantization level at a first time instant to a second quantization level at a later time instant, wherein the difference between one quantizer level and another quantizer level is defined by the quite large quantizer step size, which is preferable for a coarse quantization. Unfortunately, such a quantizer level change amounting to the large quantizer step size can be triggered by only a small change in parameter, when the unquantized parameter is in the middle between two quantization levels. It is clear that the occurrence of such quantizer index changes in the side information results in the same strong changes in the signal synthesis stage. When—as an example—the interchannel level difference is considered, it becomes clear that a large change results in a large decrease of loudness of a certain loudspeaker signal and an accompanying large increase of the loudness of a signal for another loudspeaker. This situation, which is only triggered by a single quantization level change for a coarse quantization can be perceived as an immediate relocation of a sound source from a (virtual) first place to a (virtual) second place. Such an immediate relocation from one time instant to another time instant sounds unnatural, i.e., is perceived as a modulation effect, since sound sources of, in particular, tonal signals do not change their location very fast.

Generally, also transmission errors may result in large changes of quantizer indices, which immediately result in the large changes in the multi-channel output signal, which is even more true for situations, in which a coarse quantizer for data rate reasons has been adopted.

State-of-the-art techniques for the parametric coding of two ("stereo") or more ("multi-channel") audio input channels derive the spatial parameters directly from the input signals. Examples of such parameters are—as outlined above—inter-channel level differences (ICLD) or inter-channel intensity differences (IID), inter-channel time delays (ICTD) or inter-channel phase differences (IPD), and inter-channel correlation/coherence (ICC), each of which are transmitted in a time and frequency-selective fashion, i.e. per frequency band and as a function of time. For the transmission of such parameters to the decoder, a coarse quantization of these parameters is desirable to keep the side information rate at a minimum. As a consequence, considerable rounding errors occur when comparing the transmitted parameter values to their original values. This means that even a soft and gradual change of one parameter in the original signal may lead to an abrupt change in the parameter value used in the decoder if the decision threshold from one quantized parameter value to the next value is exceeded. Since these parameter values are used for the synthesis of the output signal, abrupt changes in parameter values may also cause "jumps" in the output signal which are perceived as annoying for certain types of signals as "switching" or "modulation" artifacts (depending on the temporal granularity and quantization resolution of the parameters).

The U.S. patent application Ser. No. 10/883,538 describes a process for post processing transmitted parameter values in the context of BCC-type methods in order to avoid artifacts for certain types of signals when representing parameters at low resolution. These discontinuities in the synthesis process lead to artifacts for tonal signals. Therefore, the US patent application proposes to use a tonality detector in the decoder, which is used to analyze the transmitted down-mix signal. When the signal is found to be tonal, then a smoothing operation over time is performed on the transmitted parameters. Consequently, this type of processing represents a means for efficient transmission of parameters for tonal signals.

There are, however, classes of input signals other than tonal input signals, which are equally sensitive to a coarse quantization of spatial parameters.

One example for such cases are point sources that are moving slowly between two positions (e.g. a noise signal panned very slowly to move between Center and Left Front speaker). A coarse quantization of level parameters will lead to perceptible "jumps" (discontinuities) in the spatial position and trajectory of the sound source. Since these signals are generally not detected as tonal in the decoder, prior-art smoothing will obviously not help in this case.

Other examples are rapidly moving point sources that have tonal material, such as fast moving sinusoids. Prior-art smoothing will detect these components as tonal and thus invoke a smoothing operation. However, as the speed of movement is not known to the prior-art smoothing algorithm, the applied smoothing time constant would be generally inappropriate and e.g. reproduce a moving point source with a much too slow speed of movement and a significant lag of reproduced spatial position as compared to the originally intended position.

BRIEF SUMMARY OF THE INVENTION

It is the object of the present invention to provide an improved audio signal processing concept allowing a low data rate on the one hand and a good subjective quality on the other hand.

In accordance with a first aspect of the present invention, this object is achieved by an apparatus for generating a multi-channel synthesizer control signal, comprising: a signal analyzer for analyzing a multi-channel input signal; a smoothing information calculator for determining smoothing control information in response to the signal analyzer, the smoothing information calculator being operative to determine the smoothing control information such that, in response to the smoothing control information, a synthesizer-side post-processor generates a post-processed reconstruction parameter or a post-processed quantity derived from the reconstruction parameter for a time portion of an input signal to be processed; and a data generator for generating a control signal representing the smoothing control information as the multi-channel synthesizer control signal.

In accordance with a second aspect of the present invention, this object is achieved by a multi-channel synthesizer for generating an output signal from an input signal, the input signal having at least one input channel and a sequence of quantized reconstruction parameters, the quantized reconstruction parameters being quantized in accordance with a quantization rule, and being associated with subsequent time portions of the input signal, the output signal having a number of synthesized output channels, and the number of synthesized output channels being greater than one or greater than the number of input channels, the input channel having a multi-channel synthesizer control signal representing smoothing control information, the smoothing control information depending on an encoder-side signal analysis, the smoothing control information being determined such that a synthesizer-side post-processor generates, in response to the synthesizer control signal a post-processed reconstruction parameter or a post-processed quantity derived from the reconstruction parameter, comprising: a control signal provider for providing the control signal having the smoothing control information; a post-processor for determining, in response to the control signal, the post-processed reconstruction parameter or the post-processed quantity derived from the reconstruction parameter for a time portion of the input signal to be processed, wherein the post-processor is operative to determine the post-processed reconstruction parameter or the post-processed quantity such that the value of the post-processed reconstruction parameter or the post-processed quantity is different from a value obtainable using requantization in accordance with the quantization rule; and a multi-channel reconstructor for reconstructing a time portion of the number of synthesized output channels using the time portion of the input channel and the post-processed reconstruction parameter or the post-processed value.

Further aspects of the present invention relate to a method of generating a multi-channel synthesizer control signal, a method of generating an output signal from an input signal, corresponding computer programs, or a multi-channel synthesizer control signal.

The present invention is based on the finding that an encoder-side directed smoothing of reconstruction parameters will result in an improved audio quality of the synthesized multi-channel output signal. This substantial improvement of the audio quality can be obtained by an additional encoder-side processing to determine the smoothing control information, which can, in preferred embodiments of the present invention, transmitted to the decoder, which transmission only requires a limited (small) number of bits.

On the decoder-side, the smoothing control information is used to control the smoothing operation. This encoder-guided parameter smoothing on the decoder-side can be used instead of the decoder-side parameter smoothing, which is based on for example tonality/transient detection, or can be used in combination with the decoder-side parameter smoothing. Which method is applied for a certain time portion and a certain frequency band of the transmitted down-mix signal can also be signaled using the smoothing control information as determined by a signal analyzer on the encoder-side.

To summarize, the present invention is advantageous in that an encoder-side controlled adaptive smoothing of reconstruction parameters is performed within a multi-channel synthesizer, which results in a substantial increase of audio quality on the one hand and which only results in a small amount of additional bits. Due of the fact that the inherent quality deterioration of quantization is mitigated using the additional smoothing control information, the inventive concepts can even be applied without any increase and even with a decrease of transmitted bits, since the bits for the smoothing control information can be saved by applying an even coarser quantization so that less bits are required for encoding the quantized values. Thus, the smoothing control information together with the encoded quantized values can even require the same or less bit rate of quantized values without smoothing control information as outlined in the non-prepublished US-patent application, while keeping the same level or a higher level of subjective audio quality.

Generally, the post processing for quantized reconstruction parameters used in a multi-channel synthesizer is operative to reduce or even eliminate problems associated with coarse quantization on the one hand and quantization level changes on the other hand.

While, in prior art systems, a small parameter change in an encoder may result in a strong parameter change at the decoder, since a requantization in the synthesizer is only admissible for the limited set of quantized values, the inventive device performs a post processing of reconstruction parameters so that the post processed reconstruction parameter for a time portion to be processed of the input signal is not determined by the encoder-adopted quantization raster, but results in a value of the reconstruction parameter, which is different from a value obtainable by the quantization in accordance with the quantization rule.

While, in a linear quantizer case, the prior art method only allows inversely quantized values being integer multiples of the quantizer step size, the inventive post processing allows inversely quantized values to be non-integer multiples of the quantizer step size. This means that the inventive post processing alleviates the quantizer step size limitation, since also post processed reconstruction parameters lying between two adjacent quantizer levels can be obtained by post processing and used by the inventive multi-channel reconstructor, which makes use of the post processed reconstruction parameter.

This post processing can be performed before or after requantization in a multi-channel synthesizer. When the post processing is performed with the quantized parameters, i.e., with the quantizer indices, an inverse quantizer is needed, which can inversely quantize not only to quantizer step multiples, but which can also inversely quantize to inversely quantized values between multiples of the quantizer step size.

In case the post processing is performed using inversely quantized reconstruction parameters, a straight-forward inverse quantizer can be used, and an interpolation/filtering/smoothing is performed with the inversely quantized values.

In case of a non-linear quantization rule, such as a logarithmic quantization rule, a post processing of the quantized reconstruction parameters before requantization is preferred, since the logarithmic quantization is similar to the human ear's perception of sound, which is more accurate for low-level sound and less accurate for high-level sound, i.e., makes a kind of a logarithmic compression.

It is to be noted here that the inventive merits are not only obtained by modifying the reconstruction parameter itself that is included in the bit stream as the quantized parameter. The advantages can also be obtained by deriving a post processed quantity from the reconstruction parameter. This is especially useful, when the reconstruction parameter is a difference parameter and a manipulation such as smoothing is performed on an absolute parameter derived from the difference parameter.

In a preferred embodiment of the present invention, the post processing for the reconstruction parameters is controlled by means of a signal analyser, which analyses the signal portion associated with a reconstruction parameter to find out, which signal characteristic is present. In a preferred embodiment, the decoder controlled post processing is activated only for tonal portions of the signal (with respect to frequency and/or time) or when the tonal portions are generated by a point source only for slowly moving point sources, while the post processing is deactivated for non-tonal portions, i.e., transient portions of the input signal or rapidly moving point sources having tonal material. This makes sure that the full dynamic of reconstruction parameter changes is transmitted for transient sections of the audio signal, while this is not the case for tonal portions of the signal.

Preferably, the post processor performs a modification in the form of a smoothing of the reconstruction parameters, where this makes sense from a psycho-acoustic point of view, without affecting important spatial detection cues, which are of special importance for non-tonal, i.e., transient signal portions.

The present invention results in a low data rate, since an encoder-side quantization of reconstruction parameters can be a coarse quantization, since the system designer does not have to fear significant changes in the decoder because of a change from a reconstruction parameter from one inversely quantized level to another inversely quantized level, which change is reduced by the inventive processing by mapping to a value between two requantization levels.

Another advantage of the present invention is that the quality of the system is improved, since audible artefacts caused by a change from one requantization level to the next allowed requantization level are reduced by the inventive post processing, which is operative to map to a value between two allowed requantization levels.

Naturally, the inventive post processing of quantized reconstruction parameters represents a further information loss, in addition to the information loss obtained by parameterisation in the encoder and subsequent quantization of the reconstruction parameter. This, however, is not a problem, since the inventive post processor preferably uses the actual or preceding quantized reconstruction parameters for determining a post processed reconstruction parameter to be used for reconstruction of the actual time portion of the input signal, i.e., the base channel. It has been shown that this results in an improved subjective quality, since encoder-induced errors can be compensated to a certain degree. Even when encoder-side induced errors are not compensated by the post processing of the reconstruction parameters, strong changes of the spatial perception in the reconstructed multichannel audio signal are reduced, preferably only for tonal signal portions, so that the subjective listening quality is improved in any case, irrespective of the fact, whether this results in a further information loss or not.

Other features which are considered as characteristic for the invention are set forth in the appended claims.

Although the invention is illustrated and described herein as embodied in an apparatus and a method for generating a multi-channel synthesizer control signal, a multi-channel synthesizer, a method of generating an output signal from an input signal and a machine-readable storage medium, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 1A:
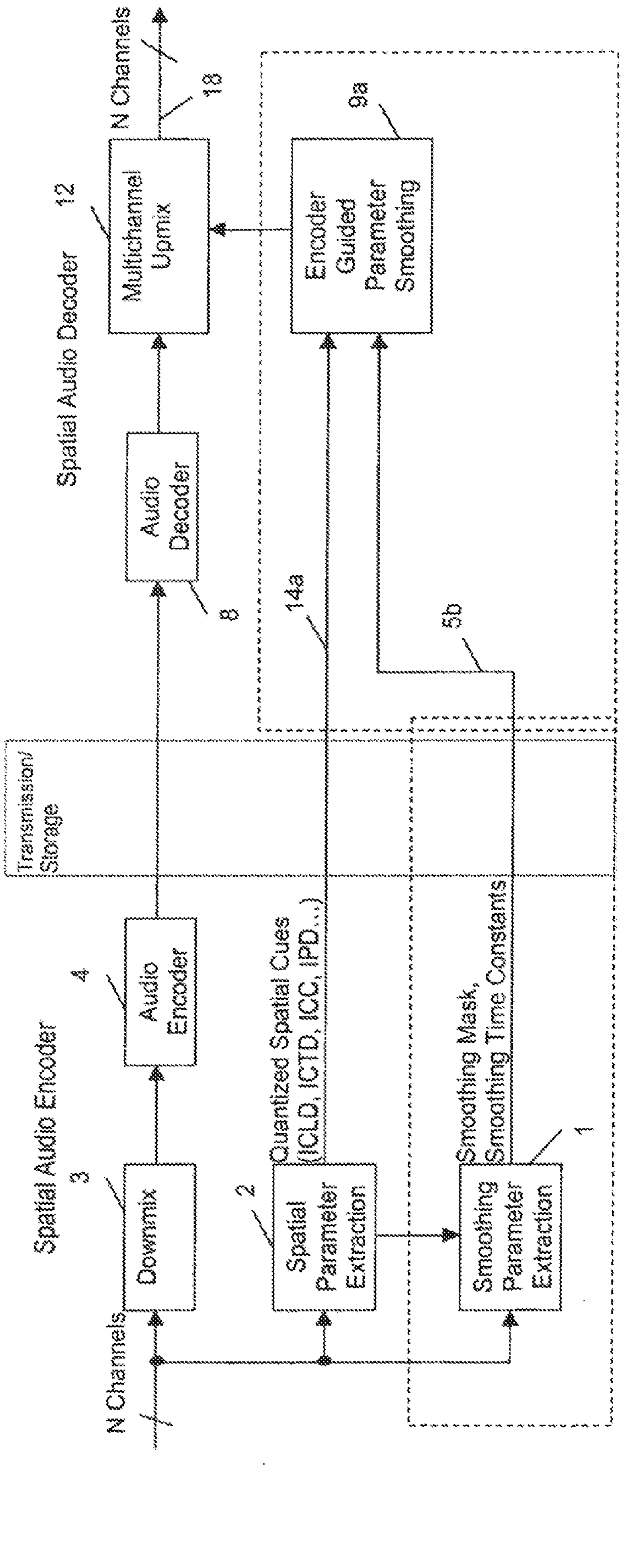
FIG. 1*a* is a schematic diagram of an encoder-side device and the corresponding decoder-side device in accordance with the first embodiment of the present invention.
Figure 1B:
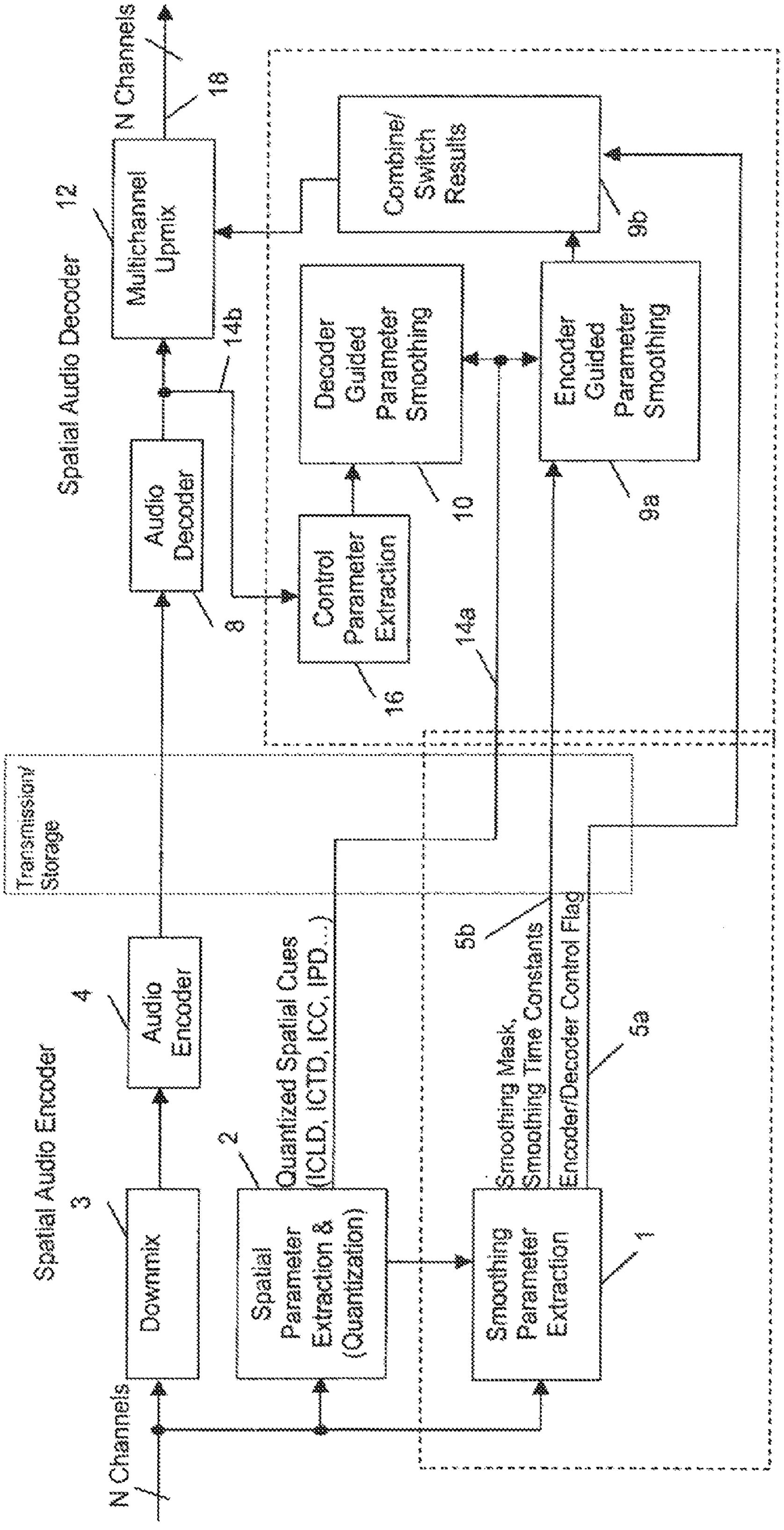
FIG. 1*b* is a schematic diagram of an encoder-side device and the corresponding decoder-side device in accordance with a further preferred embodiment of the present invention.

FIGS. 1*a* and 1*b* show block diagrams of inventive multi-channel encoder/synthesizer scenarios. As will be shown later with respect to FIG. 4*c*, a signal arriving on the decoder-side has at least one input channel and a sequence of quantized reconstruction parameters, the quantized reconstruction parameters being quantized in accordance with a quantization rule. Each reconstruction parameter is associated with a time portion of the input channel so that a sequence of time portions is associated with a sequence of quantized reconstruction parameters. Additionally, the output signal, which is generated by a multi-channel synthesizer as shown in FIGS. 1*a* and 1*b* has a number of synthesized output channels, which is in any case greater than the number of input channels in the input signal. When the number of input channels is 1, i.e. when there is a single input channel, the number of output channels will be 2 or more. When, however, the number of input channels is 2 or 3, the number of output channels will be at least 3 or at least 4 respectively.

In the BCC case, the number of input channels will be 1 or generally not more than 2, while the number of output channels will be 5 (left-surround, left, center, right, right surround) or 6 (5 surround channels plus 1 sub-woofer channel) or even more in case of a 7.1 or 9.1 multi-channel format. Generally stated, the number of output sources will be higher than the number of input sources.

Figure 1C:
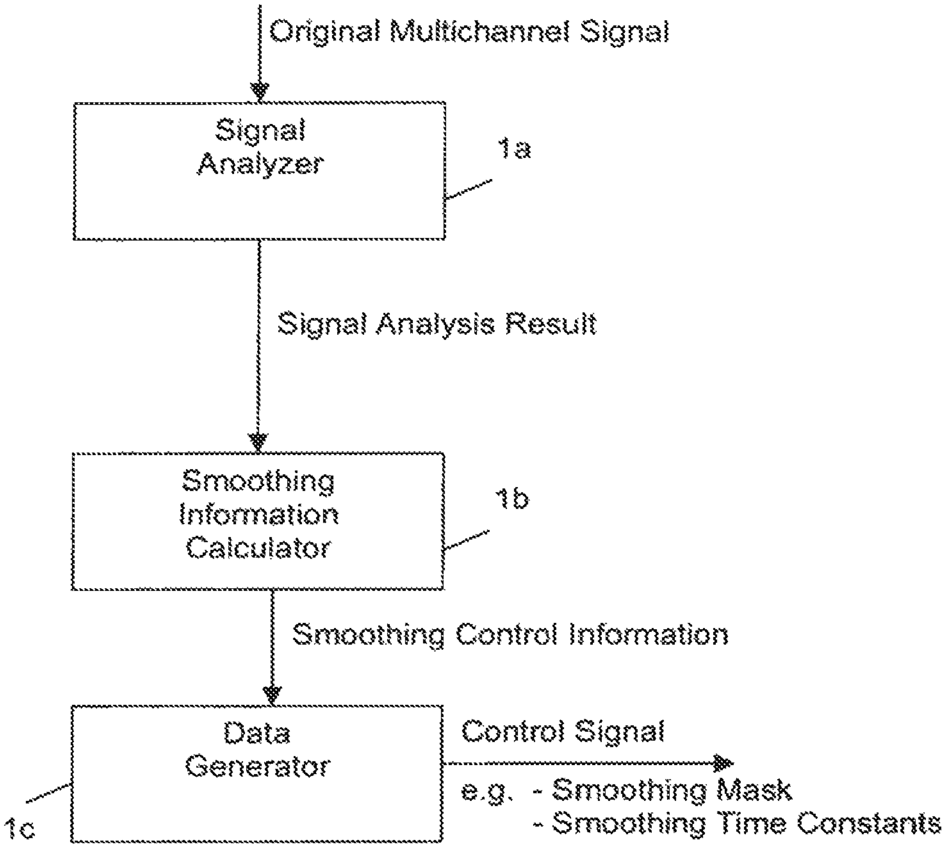
FIG. 1*c* is a schematic block diagram of a preferred control signal generator.

FIG. 1*a* illustrates, on the left side, an apparatus 1 for generating a multi-channel synthesizer control signal. Box 1 titled "Smoothing Parameter Extraction" comprises a signal analyzer, a smoothing information calculator and a data generator. As shown in FIG. 1*c*, the signal analyzer 1*a* receives, as an input, the original multi-channel signal. The signal analyzer analyses the multi-channel input signal to obtain an analysis result. This analysis result is forwarded to the smoothing information calculator for determining smoothing control information in response to the signal analyzer, i.e. the signal analysis result. In particular, the smoothing information calculator 1*b* is operative to determine the smoothing information such that, in response to the smoothing control information, a decoder-side parameter post processor generates a smoothed parameter or a smoothed quantity derived from the parameter for a time portion of the input signal to be processed, so that a value of the smoothed reconstruction parameter or the smoothed quantity is different from a value obtainable using requantization in accordance with a quantization rule.

Furthermore, the smoothing parameter extraction device 1 in FIG. 1*a* includes a data generator for outputting a control signal representing the smoothing control information as the decoder control signal.

In particular, the control signal representing the smoothing control information can be a smoothing mask, a smoothing time constant, or any other value controlling a decoder-side smoothing operation so that a reconstructed multi-channel output signal, which is based on smoothed values has an improved quality compared to reconstructed multi-channel output signals, which is based on non-smoothed values.

The smoothing mask includes the signaling information consisting e.g. of flags that indicate the "on/off" state of each frequency used for smoothing. Thus, the smoothing mask can be seen as a vector associated to one frame having a bit for each band, wherein this bit controls, whether the encoder-guided smoothing is active for this band or not.

A spatial audio encoder as shown in FIG. 1*a* preferably includes a down-mixer 3 and a subsequent audio encoder 4. Furthermore, the spatial audio encoder includes a spatial parameter extraction device 2, which outputs quantized spatial cues such as inter-channel level differences (ICLD), inter-channel time differences (ICTDs), inter-channel coherence values (ICC), inter-channel phase differences (IPD), inter-channel intensity differences (IIDs), etc. In this context, it is to be outlined that inter-channel level differences are substantially the same as inter-channel intensity differences.

Figure 11:
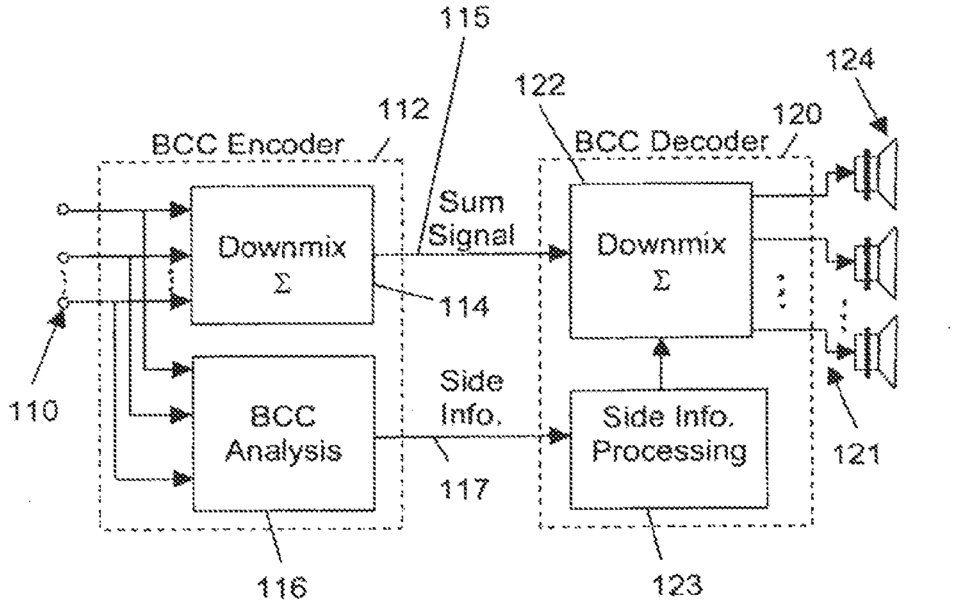
FIG. 11 PRIOR ART
FIG. 11 is a block diagram representation of a prior art BCC encoder/decoder chain.
Figure 12:
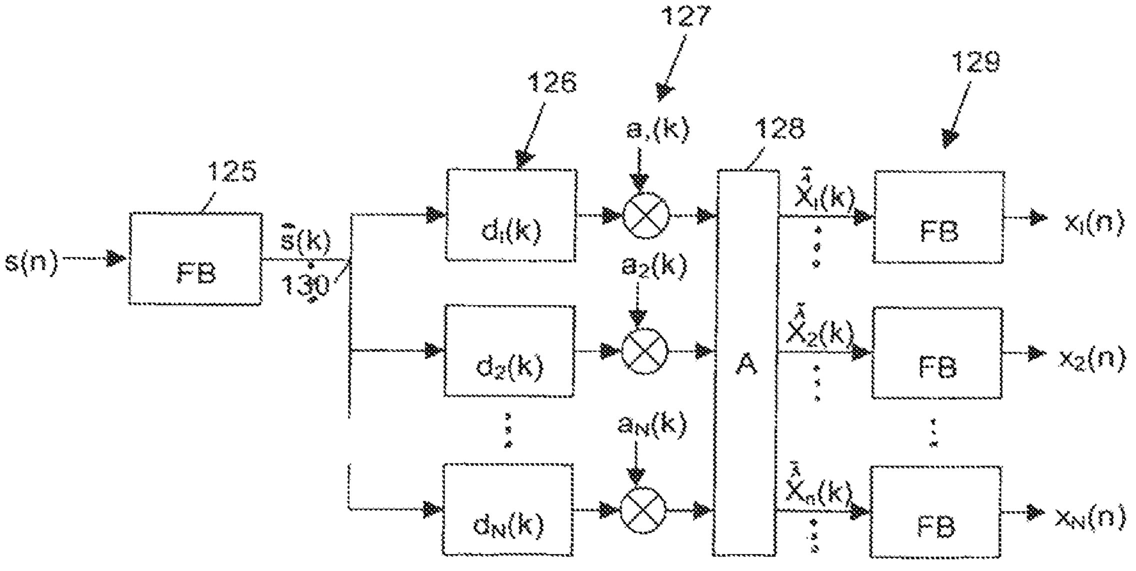
FIG. 12 PRIOR ART
FIG. 12 is a block diagram of a prior art implementation of a BCC synthesis block of FIG. 11.
Figure 13:
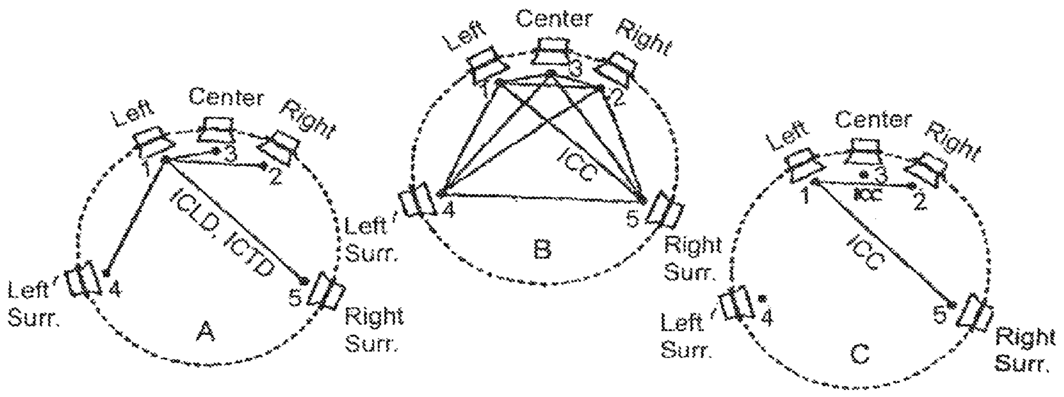
FIG. 13 PRIOR ART
FIG. 13 is a representation of a well-known scheme for determining ICLD, ICTD and ICC parameters.

The down-mixer 3 may be constructed as outlined for item 114 in FIG. 11. Furthermore, the spatial parameter extraction device 2 may be implemented as outlined for item 116 in FIG. 11. Nevertheless, alternative embodiments for the down-mixer 3 as well as the spatial parameter extractor 2 can be used in the context of the present invention.

Furthermore, the audio encoder 4 is not necessarily required. This device, however, is used, when the data rate of the down-mix signal at the output of element 3 is too high for a transmission of the down-mix signal via the transmission/storage means.

A spatial audio decoder includes an encoder-guided parameter smoothing device 9*a*, which is coupled to multi-channel up-mixer 12. The input signal for the multi-channel up-mixer 12 is normally the output signal of an audio decoder 8 for decoding the transmitted/stored down-mix signal.

Preferably, the inventive multi-channel synthesizer for generating an output signal from an input signal, the input signal having at least one input channel and a sequence of quantized reconstruction parameters, the quantized reconstruction parameters being quantized in accordance with a quantization rule, and being associated with subsequent time portions of the input signal, the output signal having a number of synthesized output channels, and the number of synthesized output channels being greater than one or greater than a number of input channels, comprises a control signal provider for providing a control signal having the smoothing control information. This control signal provider can be a data stream demultiplexer, when the control information is multiplexed with the parameter information. When, however, the smoothing control information is transmitted from device 1 to device 9*a* in FIG. 1*a* via a separate channel, which is separated from the parameter channel 14*a* or the down-mix signal channel, which is connected to the input-side of the audio decoder 8, then the control signal provider is simply an input of device 9*a* receiving the control signal generated by the smoothing parameter extraction device 1 in FIG. 1*a*.

Furthermore, the inventive multi-channel synthesizer comprises a post processor 9*a*, which is also termed an "encoder-guided parameter smoothing device". The post processor is for determining a post processed reconstruction parameter or a post processed quantity derived from the reconstruction parameter for a time portion of the input signal to be processed, wherein the post processor is operative to determine the post processed reconstruction parameter or the post processed quantity such that a value of the post processed reconstruction parameter or the post processed quantity is different from a value obtainable using requantization in accordance with the quantization rule. The post processed reconstruction parameter or the post processed quantity is forwarded from device 9*a* to the multi-channel up mixer 12 so that the multi-channel up mixer or multi-channel reconstructor 12 can perform a reconstruction operation for reconstructing a time portion of the number of synthesized output channels using the time portion of the input channel and the post processed reconstruction parameter or the post processed value.

Subsequently, reference is made to the preferred embodiment of the present invention illustrated in FIG. 1*b*, which combines the encoder-guided parameter smoothing and the decoder-guided parameter smoothing as defined in the non-prepublished U.S.-patent application Ser. No. 10/883,538. In this embodiment, the smoothing parameter extraction device 1, which is shown in detail in FIG. 1*c* additionally generates an encoder/decoder control flag 5*a*, which is transmitted to a combined/switch results block 9*b*.

The FIG. 1*b* multi-channel synthesizer or spatial audio decoder includes a reconstruction parameter post processor 10, which is the decoder-guided parameter-smoothing device, and the multi-channel reconstructor 12. The decoder-guided parameter-smoothing device 10 is operative to receive quantized and preferably encoded reconstruction parameters for subsequent time portions of the input signal. The reconstruction parameter post processor 10 is operative to determine the post-processed reconstruction parameter at an output thereof for a time portion to be processed of the input signal. The reconstruction parameter post processor operates in accordance with a post-processing rule, which is in certain preferred embodiments a low-pass filtering rule, a smoothing rule, or another similar operation. In particular, the post processor is operative to determine the post processed reconstruction parameter such that a value of the post-processed reconstruction parameter is different from a value obtainable by requantization of any quantized reconstruction parameter in accordance with the quantization rule.

The multi-channel reconstructor 12 is used for reconstructing a time portion of each of the number of synthesis output channels using the time portions of the processed input channel and the post processed reconstruction parameter.

In preferred embodiments of the present invention, the quantized reconstruction parameters are quantized BCC parameters such as inter-channel level differences, inter-channel time differences or inter-channel coherence parameters or inter-channel phase differences or inter-channel intensity differences. Naturally, all other reconstruction parameters such as stereo parameters for intensity stereo or parameters for parametric stereo can be processed in accordance with the present invention as well.

The encoder/decoder control flag transmitted via line 5*a* is operative to control the switch or combine device 9*b* to forward either decoder-guided smoothing values or encoder-guided smoothing values to the multi-channel up mixer 12.

In the following, reference will be made to FIG. 4*c*, which shows an example for a bit stream. The bit stream includes several frames 20*a*, 20*b*, 20*c*, . . . . Each frame includes a time portion of the input signal indicated by the upper rectangle of a frame in FIG. 4*c*. Additionally, each frame includes a set of quantized reconstruction parameters which are associated with the time portion, and which are illustrated in FIG. 4*c* by the lower rectangle of each frame 20*a*, 20*b*, 20*c*. Exemplarily, frame 20*b* is considered as the input signal portion to be processed, wherein this frame has preceding input signal portions, i.e., which form the "past" of the input signal portion to be processed. Additionally, there are following input signal portions, which form the "future" of the input signal portion to be processed (the input portion to be processed is also termed as the "actual" input signal portion), while input signal portions in the "past" are termed as former input signal portions, while signal portions in the future are termed as later input signal portions.

The inventive method successfully handles problematic situations with slowly moving point sources preferably having noise-like properties or rapidly moving point sources having tonal material such as fast moving sinusoids by allowing a more explicit encoder control of the smoothing operation carried out in the decoder.

As outlined before, the preferred way of performing a postprocessing operation within the encoder-guided parameter smoothing device 9*a* or the decoder-guided parameter smoothing device 10 is a smoothing operation carried out in a frequency-band oriented way.

Furthermore, in order to actively control the post processing in the decoder performed by the encoder-guided parameter smoothing device 9*a*, the encoder conveys signaling information preferably as part of the side information to the synthesizer/decoder. The multi-channel synthesizer control signal can, however, also be transmitted separately to the decoder without being part of side information of parametric information or down-mix signal information.

In a preferred embodiment, this signaling information consists of flags that indicate the "on/off" state of each frequency band used for smoothing. In order to allow an efficient transmission of this information, a preferred embodiment can also use a set of "short cuts" to signal certain frequently used configurations with very few bits.

To this end, the smoothing information calculator 1*b* in FIG. 1*c* determines that no smoothing is to be carried out in any of the frequency bands. This is signaled via an "all-off" short cut signal generated by the data generator 1*c*. In particular, a control signal representing the "all-off" short cut signal can be a certain bit pattern or a certain flag.

Furthermore, the smoothing information calculator 1*b* may determine that in all frequency bands, an encoder-guided smoothing operation is to be performed. To this end, the data generator 1*c* generates an "all-on" short cut signal, which signals that smoothing is applied in all frequency bands. This signal can be a certain bit pattern or a flag.

Furthermore, when the signal analyzer 1*a* determines that the signal did not very much change from one time portion to the next time portion, i.e. from a current time portion to a future time portion, the smoothing information calculator 1*b* may determine that no change in the encoder-guided parameter smoothing operation has to be performed. Then, the data generator 1*c* will generate a "repeat last mask" short cut signal, which will signal to the decoder/synthesizer that the same band-wise on/off status shall be used for smoothing as it was employed for the processing of the previous frame.

In a preferred embodiment, the signal analyzer 1*a* is operative to estimate the speed of movement so that the impact of the decoder smoothing is adapted to the speed of a spatial movement of a point source. As a result of this process, a suitable smoothing time constant is determined by the smoothing information calculator 1*b* and signaled to the decoder by dedicated side information via data generator 1*c*. In a preferred embodiment, the data generator 1*c* generates and transmits an index value to a decoder, which allows the decoder to select between different pre-defined smoothing time constants (such as 125 ms, 250 ms, 500 ms, . . . ). In a further preferred embodiment, only one time constant is transmitted for all frequency bands. This reduces the amount of signaling information for smoothing time constants and is sufficient for the frequently occurring case of one dominant moving point source in the spectrum. An exemplary process of determining a suitable smoothing time constant is described in connection with FIGS. 2*a* and 2*b*.

The explicit control of the decoder smoothing process requires a trans-mission of some additional side information compared to a decoder-guided smoothing method. Since this control may only be necessary for a certain fraction of all input signals with specific properties, both approaches are preferably combined into a single method, which is also called the “hybrid method”. This can be done by transmitting signaling information such as one bit determining whether smoothing is to be carried out based on a tonality/transient estimation in the decoder as performed by device 16 in FIG. 1*b* or under explicit encoder control. In the latter case, the side information 5*a* of FIG. 1*b* is transmitted to the decoder.

Subsequently, preferred embodiments for identifying slowly moving point sources and estimating appropriate time constants to be signaled to a decoder are discussed. Preferably, all estimations are carried out in the encoder and can, thus, access non-quantized versions of signal parameters, which are, of course, not available in the decoder because of the fact that device 2 in FIG. 1*a* and FIG. 1*b* transmits quantized spatial cues for data compression reasons.

Subsequently, reference is made to FIGS. 2*a* and 2*b* for showing a preferred embodiment for identification of slowly moving point sources. The spatial position of a sound event within a certain frequency band and time frame is identified as shown in connection with FIG. 2*a*. In particular, for each audio output channel, a unit-length vector $e_x$ indicates the relative positioning of the corresponding loud speaker in a regular listening set-up. In the example shown in FIG. 2*a*, the common 5-channel listening set-up is used with speakers L, C, R, Ls, and Rs and the corresponding unit-length vectors $e_L$, $e_C$, $e_R$, $e_{Ls}$, and $e_{Rs}$.

Figure 2A:
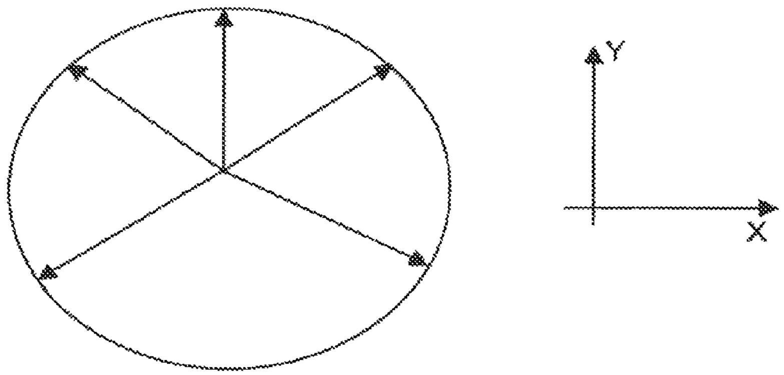
FIG. 2*a* is a schematic representation for determining the spatial position of a sound source.

The spatial position of the sound event within a certain frequency band and time frame is calculated as the energy-weighted average of these vectors as outlined in the equation of FIG. 2*a*. As becomes clear from FIG. 2*a*, each unit-length vector has a certain x-coordinate and a certain y-coordinate. By multiplying each coordinate of the unit-length vector with the corresponding energy and by summing-up the x-coordinate terms and the y-coordinate terms, a spatial position for a certain frequency band and a certain time frame at a certain position x, y is obtained.

Figure 2B:
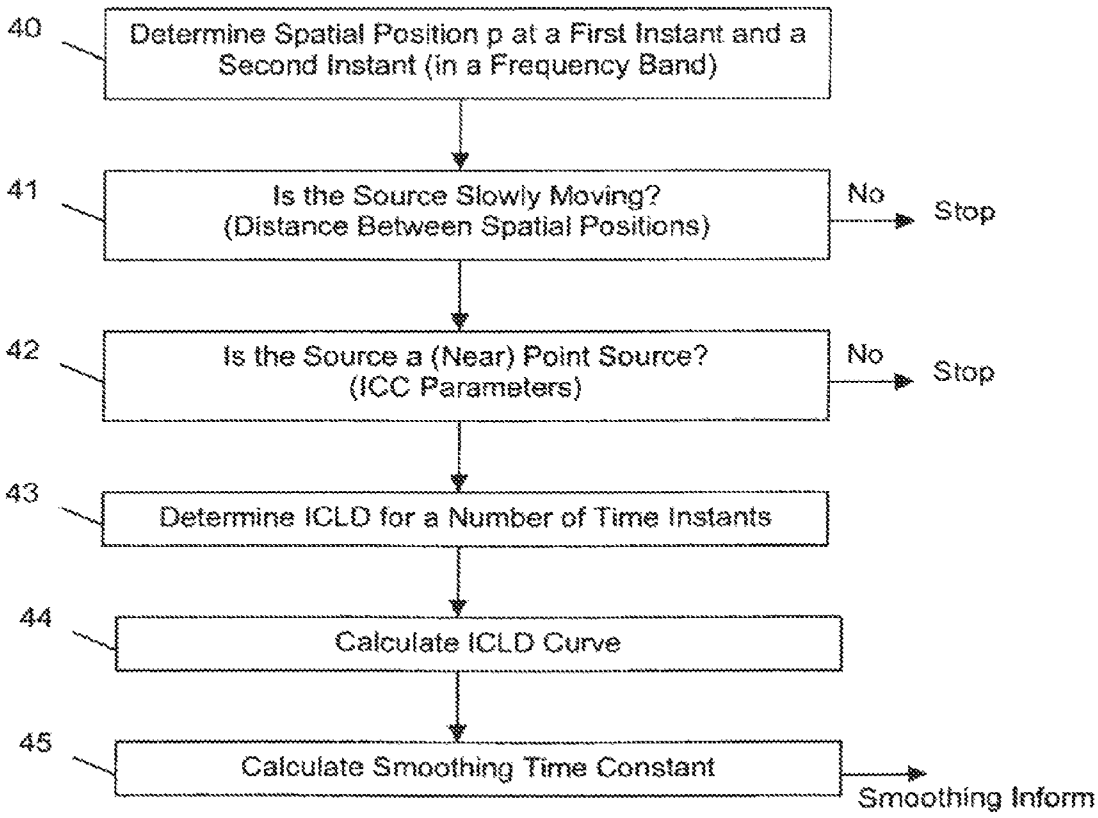
FIG. 2*b* is a flow chart of a preferred embodiment for calculating a smoothing time constant as an example for smoothing information.

As outlined in step 40 of FIG. 2*b*, this determination is performed for two subsequent time instants.

Then, in step 41, it is determined, whether the source having the spatial positions $p_1$, $p_2$ is slowly moving. When the distance between subsequent spatial positions is below a predetermined threshold, then the source is determined to be a slowly moving source. When, however, it is determined that the displacement is above a certain maximum displacement threshold, then it is determined that the source is not slowly moving, and the process in FIG. 2*b* is stopped.

Values L, C, R, Ls, and Rs in FIG. 2*a* denote energies of the corresponding channels, respectively. Alternatively, the energies measured in dB may also be employed for determining a spatial position p.

In step 42, it is determined, whether the source is a point or a near point source. Preferably, point sources are detected, when the relevant ICC parameters exceed a certain minimum threshold such as 0.85. When it is determined that the ICC parameter is below the predetermined threshold, then the source is not a point source and the process in FIG. 2*a* is stopped. When, however, it is determined that the source is a point source or a near point source, the process in FIG. 2*b* advances to step 43. In this step, preferably the inter-channel level difference parameters of the parametric multi-channel scheme are determined within a certain observation interval, resulting in a number of measurements. The observation interval may consist of a number of coding frames or a set of observations taking place at a higher time resolution than defined by the sequence of frames.

In a step 44, the slope of an ICLD curve for subsequent time instances is calculated. Then, in step 45, a smoothing time constant is chosen, which is inversely proportional to the slope of the curve.

Figure 4A:
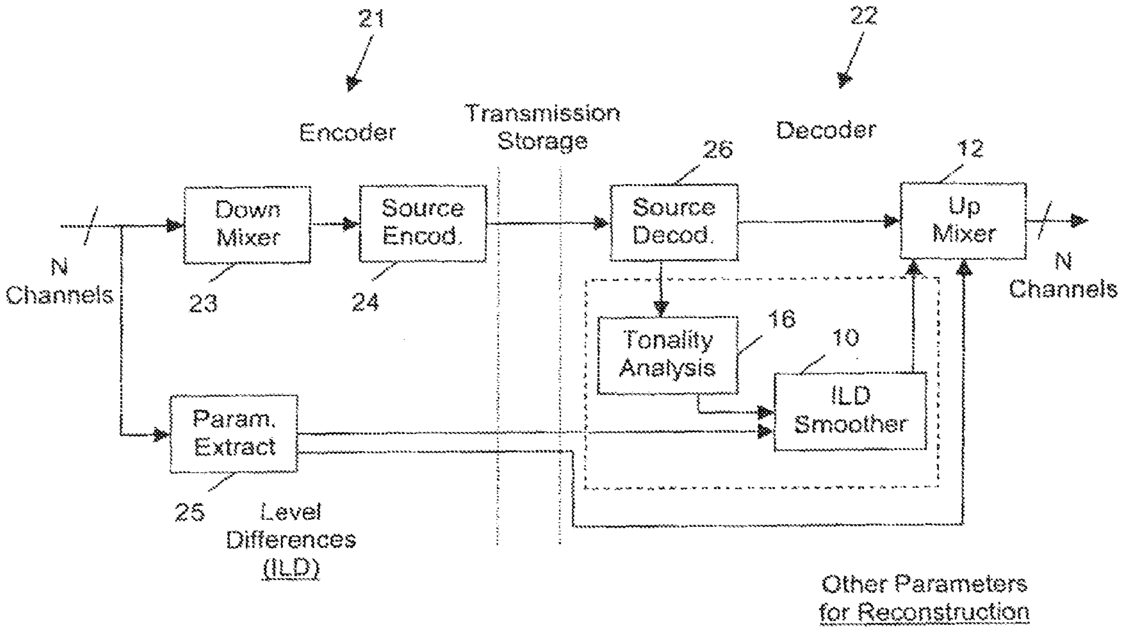
FIG. 4*a* is a schematic representation illustrating a decoder-side directed system.
Figure 4B:
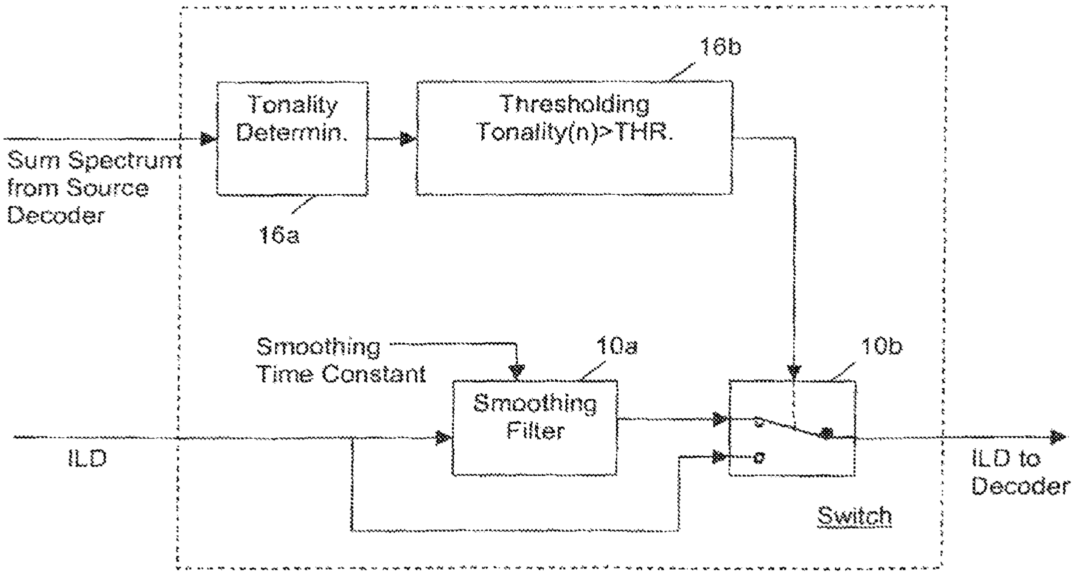
FIG. 4*b* is a schematic diagram of a post processor/signal analyzer combination to be used in the inventive multi-channel synthesizer of FIG. 1*b;*
Figure 4C:
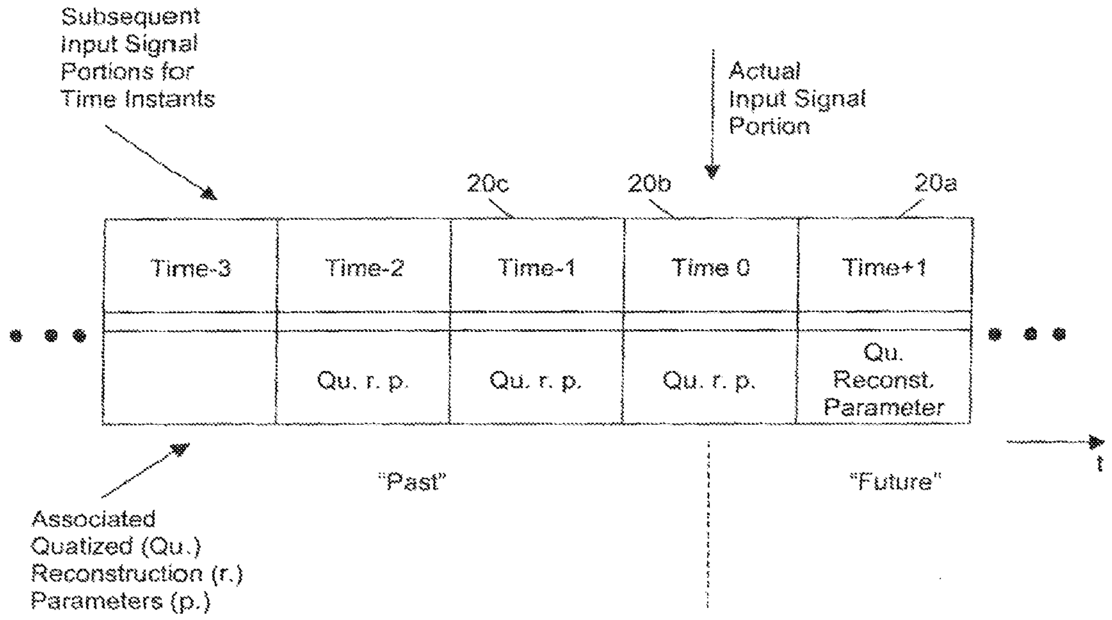
FIG. 4*c* is a schematic representation of time portions of the input signal and associated quantized reconstruction parameters for past signal portions, actual signal portions to be processed and future signal portions.

Then, in step 45, a smoothing time constant as an example of a smoothing information is output and used in a decoder-side smoothing device, which, as it becomes clear from FIGS. 4*a* and 4*b* may be a smoothing filter. The smoothing time constant determined in step 45 is, therefore, used to set filter parameters of a digital filter used for smoothing in block 9*a*.

Figure 5:
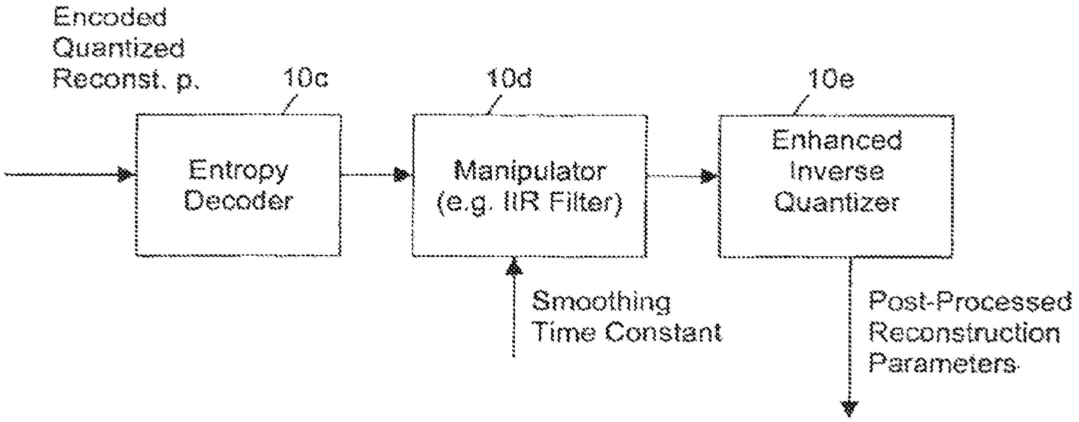
FIG. 5 is an embodiment of the encoder guided parameter smoothing device from FIG. 1.
Figure 6A:
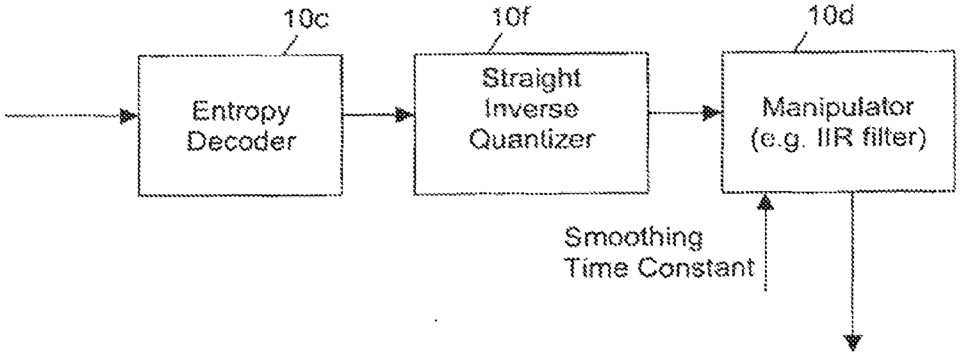
FIG. 6*a* is another embodiment of the encoder guided parameter smoothing device shown in FIG. 1.

Regarding FIG. 1*b*, it is emphasized that the encoder-guided parameter smoothing 9*a* and decoder-guided parameter smoothing 10 can also be implemented using a single device such as shown in FIG. 4*b*, 5, or 6*a*, since the smoothing control information on the one hand and the decoder-determined information output by the control parameter extraction device 16 on the other hand both act on a smoothing filter and the activation of the smoothing filter in a preferred embodiment of the present invention.

When only one common smoothing time constant is signaled for all frequency bands, the individual results for each band can be combined into an overall result e.g. by averaging or energy-weighted averaging. In this case, the decoder applies the same (energy-weighted) averaged smoothing time constant to each band so that only a single smoothing time constant for the whole spectrum needs to be transmitted. When bands are found with a significant deviation from the combined time constant, smoothing may be disabled for these bands using the corresponding “on/off” flags.

Subsequently, reference is made to FIGS. 3*a*, 3*b*, and 3*c* to illustrate an alternative embodiment, which is based on an analysis-by-synthesis approach for encoder-guided smoothing control. The basic idea consists of a comparison of a certain reconstruction parameter (preferably the IID/ICLD parameter) resulting from quantization and parameter smoothing to the corresponding non-quantized (i.e. measured) (IID/ICLD) parameter. This process is summarized in the schematic preferred embodiment illustrated in FIG. 3*a*. Two different multi-channel input channels such as L on the one hand and R on the other hand are input in respective analysis filter banks. The filter bank outputs are segmented and windowed to obtain a suitable time/frequency representation.

Figure 3A:
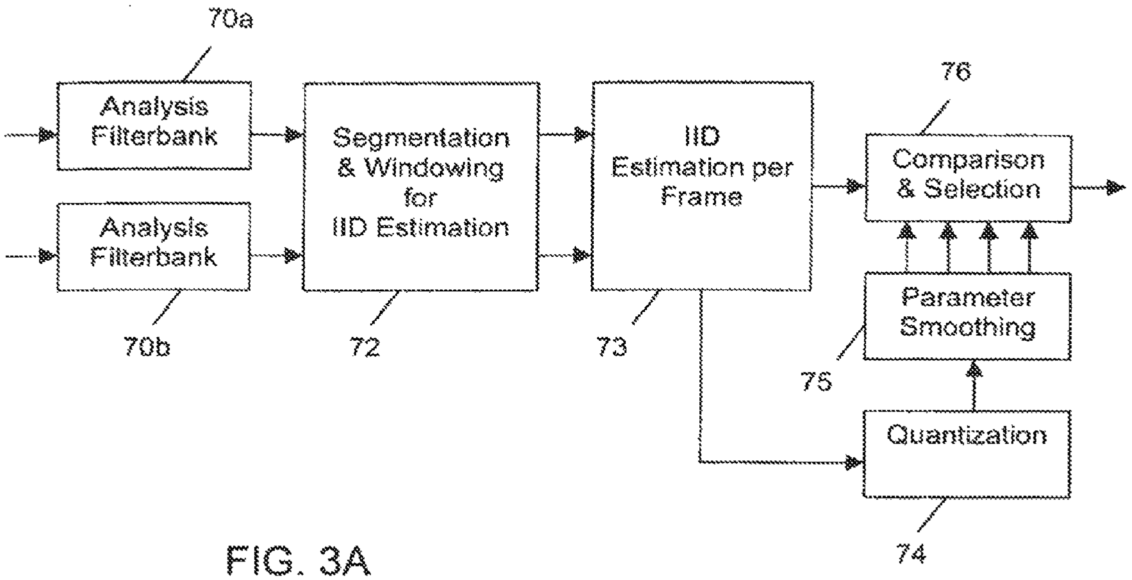
FIG. 3*a* is an alternative embodiment for calculating quantized inter-channel intensity differences and corresponding smoothing parameters.

Thus, FIG. 3*a* includes an analysis filter bank device having two separate analysis filter banks 70*a*, 70*b*. Naturally, a single analysis filter bank and a storage can be used twice to analyze both channels. Then, in the segmentation and windowing device 72, the time segmentation is performed. Then, an ICLD/IID estimation per frame is performed in device 73. The parameter for each frame is subsequently sent to a quantizer 74. Thus, a quantized parameter at the output of device 74 is obtained. The quantized parameter is subsequently processed by a set of different time constants in device 75. Preferably, essentially all time constants that are available to the decoder are used by device 75. Finally, a comparison and selection unit 76 compares the quantized and smoothed IID parameters to the original (unprocessed) IID estimates. Unit 76 outputs the quantized IID parameter and the smoothing time constant that resulted in a best fit between processed and originally measured IID values.

Subsequently, reference is made to the flow chart in FIG. 3*c*, which corresponds to the device in FIG. 3*a*. As outlined in step 46, IID parameters for several frames are generated. Then, in step 47, these IID parameters are quantized. In step 48, the quantized IID parameters are smoothed using different time constants. Then, in step 49, an error between a smoothed sequence and an originally generated sequence is calculated for each time constant used in step 49. Finally, in step 50, the quantized sequence is selected together with the smoothing time constant, which resulted in the smallest error. Then, step 50 outputs the sequence of quantized values together with the best time constant.

In a more elaborate embodiment, which is preferred for advanced devices, this process can also be performed for a set of quantized IID/ICLD parameters selected from the repertoire of possible IID values from the quantizer. In that case, the comparison and selection procedure would comprise a comparison of processed IID and unprocessed IID parameters for various combinations of transmitted (quantized) IID parameters and smoothing time constants. Thus, as outlined by the square brackets in step 47, in contrast to the first embodiment, the second embodiment uses different quantization rules or the same quantization rules but different quantization step sizes to quantize the IID parameters. Then, in step 51, an error is calculated for each quantization way and each time constant. Thus, the number of candidates to be decided in step 52 compared to step 50 of FIG. 3*c* is, in the more elaborate embodiment, higher by a factor being equal to the number of different quantization ways compared to the first embodiment.

Then, in step 52, a two-dimensional optimization for (1) error and (2) bit rate is performed to search for a sequence of quantized values and a matching time constant. Finally, in step 53, the sequence of quantized values is entropy-encoded using a Huffman code or an arithmetic code. Step 53 finally results in a bit sequence to be transmitted to a decoder or multi-channel synthesizer.

Figure 3B:
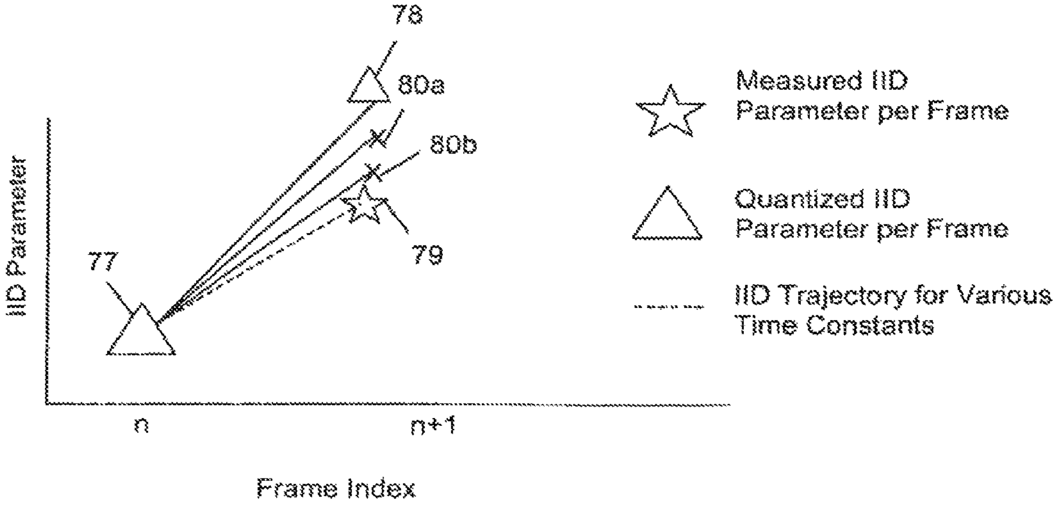
FIG. 3*b* is an exemplary diagram illustrating the difference between a measured IID parameter per frame and a quantized IID parameter per frame and a processed quantized IID parameter per frame for various time constants.

FIG. 3*b* illustrates the effect of post processing by smoothing. Item 77 illustrates a quantized IID parameter for frame n. Item 78 illustrates a quantized IID parameter for a frame having a frame index n+1. The quantized IID parameter 78 has been derived by a quantization from the measured IID parameter per frame indicated by reference number 79. Smoothing of this parameter sequence of quantized parameter 77 and 78 with different time constants results in smaller post-processed parameter values at 80*a* and 80*b*. The time constant for smoothing the parameter sequence 77, 78, which resulted in the post-processed (smoothed) parameter 80*a* was smaller than the smoothing time constant, which resulted in a post-processed parameter 80*b*. As known in the art, the smoothing time constant is inverse to the cut-off frequency of a corresponding low-pass filter.

Figure 3C:
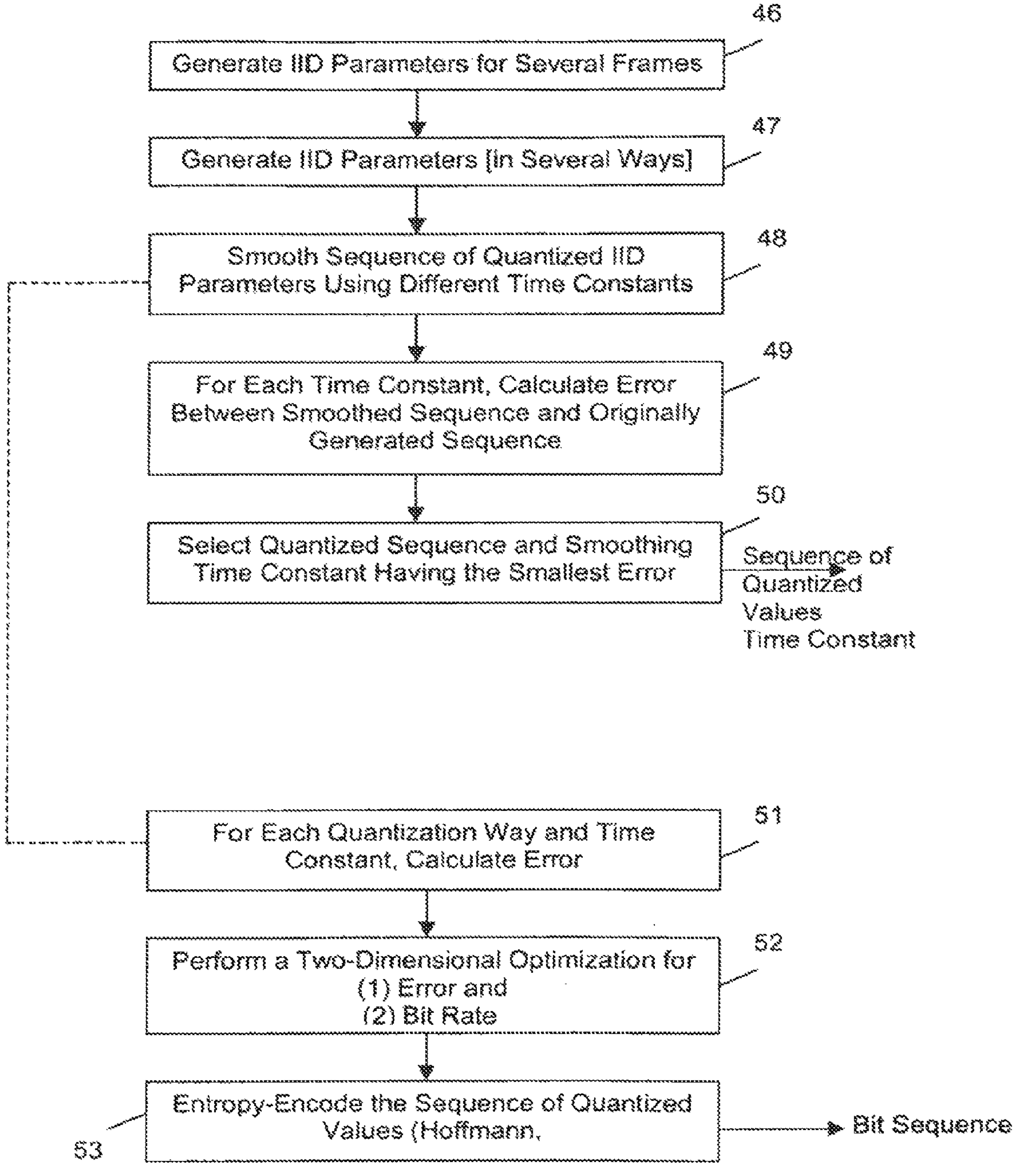
FIG. 3*c* is a flow chart of a preferred embodiment of the concept as applied in FIG. 3*a;*

The embodiment illustrated in connection with steps 51 to 53 in FIG. 3*c* is preferable, since one can perform a two-dimensional optimization for error and bit rate, since different quantization rules may result in different numbers of bits for representing the quantized values. Furthermore, this embodiment is based on the finding that the actual value of the post-processed reconstruction parameter depends on the quantized reconstruction parameter as well as the way of processing.

For example, a large difference in (quantized) IID from frame to frame, in combination with a large smoothing time constant effectively results in only a small net effect of the processed IID. The same net effect may be constructed by a small difference in IID parameters, compared with a smaller time constant. This additional degree of freedom enables the encoder to optimize both the reconstructed IID as well as the resulting bit rate simultaneously (given the fact that transmission of a certain IID value can be more expensive than transmission of a certain alternative IID parameter).

As outlined above, the effect on IID trajectories on the smoothing is outlined in FIG. 3*b*, which shows an IID trajectory for various values of smoothing time constants, where the star indicates a measured IID per frame, and where the triangle indicates a possible value of an IID quantizer. Given a limited accuracy of the IID quantizer, the IID value indicated by the star on frame n+1 is not available. The closest IID value is indicated by the triangle. The lines in the figure show the IID trajectory between the frames that would result from various smoothing constants. The selection algorithm will choose the smoothing time constant that results in an IID trajectory that ends closest to the measured IID parameter for frame n+1.

The examples above are all related to IID parameters. In principle, all described methods can also be applied to IPD, ITD, or ICC parameters.

The present invention, therefore, relates to an encoder-side processing and a decoder-side processing, which form a system using a smoothing enable/disable mask and a time constant signaled via a smoothing control signal. Furthermore, a band-wise signaling per frequency band is performed, wherein, furthermore, short cuts are preferred, which may include an all bands on, an all bands off or a repeat previous status short cut. Furthermore, it is preferred to use one common smoothing time constant for all bands. Furthermore, in addition or alternatively, a signal for automatic tonality-based smoothing versus explicit encoder control can be transmitted to implement a hybrid method.

Subsequently, reference is made to the decoder-side implementation, which works in connection with the encoder-guided parameter smoothing.

FIG. 4*a* shows an encoder-side 21 and a decoder-side 22. In the encoder, N original input channels are input into a down mixer stage 23. The down mixer stage is operative to reduce the number of channels to e.g. a single mono-channel or, possibly, to two stereo channels. The down mixed signal representation at the output of down mixer 23 is, then, input into a source encoder 24, the source encoder being implemented for example as an mp3 encoder or as an AAC encoder producing an output bit stream. The encoder-side 21 further comprises a parameter extractor 25, which, in accordance with the present invention, performs the BCC analysis (block 116 in FIG. 11) and outputs the quantized and preferably Huffman-encoded interchannel level differences (ICLD). The bit stream at the output of the source encoder 24 as well as the quantized reconstruction parameters output by parameter extractor 25 can be transmitted to a decoder 22 or can be stored for later transmission to a decoder, etc.

The decoder 22 includes a source decoder 26, which is operative to reconstruct a signal from the received bit stream (originating from the source encoder 24). To this end, the source decoder 26 supplies, at its output, subsequent time portions of the input signal to an up-mixer 12, which performs the same functionality as the multi-channel reconstructor 12 in FIG. 1. Preferably, this functionality is a BCC synthesis as implemented by block 122 in FIG. 11.

Contrary to FIG. 11, the inventive multi-channel synthesizer further comprises the post processor 10 (FIG. 4*a*), which is termed as “interchannel level difference (ICLD) smoother”, which is controlled by the input signal analyser 16, which preferably performs a tonality analysis of the input signal.

It can be seen from FIG. 4*a* that there are reconstruction parameters such as the interchannel level differences (ICLDs), which are input into the ICLD smoother, while there is an additional connection between the parameter extractor 25 and the up-mixer 12. Via this by-pass connection, other parameters for reconstruction, which do not have to be post processed, can be supplied from the parameter extractor 25 to the up-mixer 12.

FIG. 4*b* shows a preferred embodiment of the signal-adaptive reconstruction parameter processing formed by the signal analyser 16 and the ICLD smoother 10.

The signal analyser 16 is formed from a tonality determination unit 16*a* and a subsequent thresholding device 16*b*. Additionally, the reconstruction parameter post processor 10 from FIG. 4*a* includes a smoothing filter 10*a* and a post processor switch 10*b*. The post processor switch 10*b* is operative to be controlled by the thresholding device 16*b* so that the switch is actuated, when the thresholding device 16*b* determines that a certain signal characteristic of the input signal such as the tonality characteristic is in a predetermined relation to a certain specified threshold. In the present case, the situation is such that the switch is actuated to be in the upper position (as shown in FIG. 4*b*), when the tonality of a signal portion of the input signal, and, in particular, a certain frequency band of a certain time portion of the input signal has a tonality above a tonality threshold. In this case, the switch 10*b* is actuated to connect the output of the smoothing filter 10*a* to the input of the multi-channel reconstructor 12 so that post processed, but not yet inversely quantized interchannel differences are supplied to the decoder/multi-channel reconstructor/up-mixer 12.

When, however, the tonality determination means in a decoder-controlled implementation determines that a certain frequency band of a actual time portion of the input signal, i.e., a certain frequency band of an input signal portion to be processed has a tonality lower than the specified threshold, i.e., is transient, the switch is actuated such that the smoothing filter 10*a* is by-passed.

In the latter case, the signal-adaptive post processing by the smoothing filter 10*a* makes sure that the reconstruction parameter changes for transient signals pass the post processing stage unmodified and result in fast changes in the reconstructed output signal with respect to the spatial image, which corresponds to real situations with a high degree of probability for transient signals.

It is to be noted here that the FIG. 4*b* embodiment, i.e., activating post processing on the one hand and fully deactivating post processing on the other hand, i.e., a binary decision for post processing or not is only a preferred embodiment because of its simple and efficient structure. Nevertheless, it has to be noted that, in particular with respect to tonality, this signal characteristic is not only a qualitative parameter but also a quantitative parameter, which can be normally between 0 and 1. In accordance with the quantitatively determined parameter, the smoothing degree of a smoothing filter or, for example, the cut-off frequency of a low pass filter can be set so that, for heavily tonal signals, a strong smoothing is activated, while for signals which are not so tonal, the smoothing with a lower smoothing degree is initiated.

Naturally, one could also detect transient portions and exaggerate the changes in the parameters to values between predefined quantized values or quantization indices so that, for strong transient signals, the post processing for the reconstruction parameters results in an even more exaggerated change of the spatial image of a multi-channel signal. In this case, a quantization step size of 1 as instructed by subsequent reconstruction parameters for subsequent time portions can be enhanced to for example 1.5, 1.4, 1.3 etc, which results in an even more dramatically changing spatial image of the reconstructed multi-channel signal.

It is to be noted here that a tonal signal characteristic, a transient signal characteristic or other signal characteristics are only examples for signal characteristics, based on which a signal analysis can be performed to control a reconstruction parameter post processor. In response to this control, the reconstruction parameter post processor determines a post processed reconstruction parameter having a value which is different from any values for quantization indices on the one hand or requantization values on the other hand as determined by a predetermined quantization rule.

It is to be noted here that post processing of reconstruction parameters dependent on a signal characteristic, i.e., a signal-adaptive parameter post processing is only optional. A signal-independent post processing also provides advantages for many signals. A certain post processing function could, for example, be selected by the user so that the user gets enhanced changes (in case of an exaggeration function) or damped changes (in case of a smoothing function). Alternatively, a post processing independent of any user selection and independent of signal characteristics can also provide certain advantages with respect to error resilience. It becomes clear that, especially in case of a large quantizer step size, a transmission error in a quantizer index may result in audible artefacts. To this end, one would perform a forward error correction or another similar operation, when the signal has to be transmitted over error-prone channels. In accordance with the present invention, the post processing can obviate the need for any bit-inefficient error correction codes, since the post processing of the reconstruction parameters based on reconstruction parameters in the past will result in a detection of erroneous transmitted quantized reconstruction parameters and will result in suitable counter measures against such errors. Additionally, when the post processing function is a smoothing function, quantized reconstruction parameters strongly differing from former or later reconstruction parameters will automatically be manipulated as will be outlined later.

FIG. 5 shows a preferred embodiment of the reconstruction parameter post processor 10 from FIG. 4*a*. In particular, the situation is considered, in which the quantized reconstruction parameters are encoded. Here, the encoded quantized reconstruction parameters enter an entropy decoder 10*c*, which outputs the sequence of decoded quantized reconstruction parameters. The reconstruction parameters at the output of the entropy decoder are quantized, which means that they do not have a certain "useful" value but which means that they indicate certain quantizer indices or quantizer levels of a certain quantization rule implemented by a subsequent inverse quantizer. The manipulator 10*d* can be, for example, a digital filter such as an IIR (preferably) or a FIR filter having any filter characteristic determined by the required post processing function. A smoothing or low pass filtering post-processing function is preferred. At the output of the manipulator 10*d*, a sequence of manipulated quantized reconstruction parameters is obtained, which are not only integer numbers but which are any real numbers lying within the range determined by the quantization rule. Such a manipulated quantized reconstruction parameter could have values of 1.1, 0.1, 0.5, . . . , compared to values 1, 0, 1 before stage 10*d*. The sequence of values at the output of block 10*d* are then input into an enhanced inverse quantizer 10*e* to obtain post-processed reconstruction parameters, which can be used for multi-channel reconstruction (e.g. BCC synthesis) in block 12 of FIGS. 1*a* and 1*b*.

It has to be noted that the enhanced quantizer 10*e* (FIG. 5) is different from a normal inverse quantizer since a normal inverse quantizer only maps each quantization input from a limited number of quantization indices into a specified inversely quantized output value. Normal inverse quantizers cannot map non-integer quantizer indices. The enhanced inverse quantizer 10*e* is therefore implemented to preferably use the same quantization rule such as a linear or logarithmic quantization law, but it can accept non-integer inputs to provide output values which are different from values obtainable by only using integer inputs.

Figure 6B:
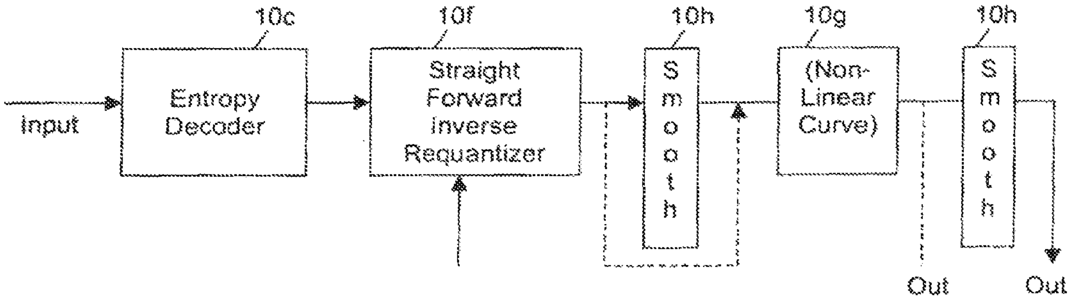
FIG. 6*b* is another preferred embodiment of the encoder guided parameter smoothing device.

With respect to the present invention, it basically makes no difference, whether the manipulation is performed before requantization (see FIG. 5) or after requantization (see FIG. 6*a*, FIG. 6*b*). In the latter case, the inverse quantizer only has to be a normal straightforward inverse quantizer, which is different from the enhanced inverse quantizer 10*e* of FIG. 5 as has been outlined above. Naturally, the selection between FIG. 5 and FIG. 6*a* will be a matter of choice depending on the certain implementation. For the present implementation, the FIG. 5 embodiment is preferred, since it is more compatible with existing BCC algorithms. Nevertheless, this may be different for other applications.

FIG. 6*b* shows an embodiment in which the enhanced inverse quantizer 10*e* in FIG. 6*a* is replaced by a straightforward inverse quantizer and a mapper 10*g* for mapping in accordance with a linear or preferably non-linear curve. This mapper can be implemented in hardware or in software such as a circuit for performing a mathematical operation or as a look up table. Data manipulation using e.g. the smoother 10*g* can be performed before the mapper 10*g* or after the mapper 10*g* or at both places in combination. This embodiment is preferred, when the post processing is performed in the inverse quantizer domain, since all elements 10*f*, 10*h*, 10*g* can be implemented using straightforward components such as circuits of software routines.

Figure 7A:
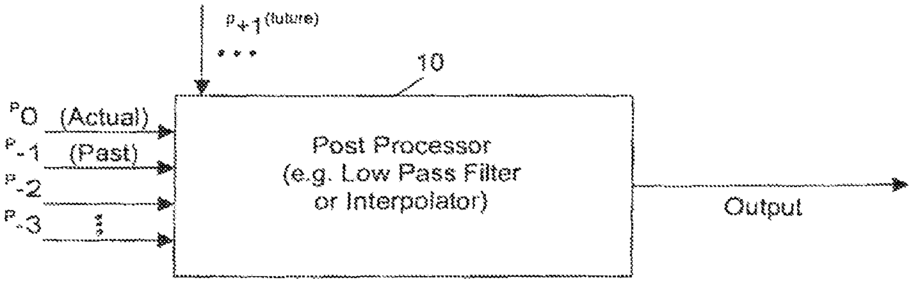
FIG. 7*a* is another embodiment of the encoder guided parameter smoothing device shown in FIG. 1.

Generally, the post processor 10 is implemented as a post processor as indicated in FIG. 7*a*, which receives all or a selection of actual quantized reconstruction parameters, future reconstruction parameters or past quantized reconstruction parameters. In the case, in which the post processor only receives at least one past reconstruction parameter and the actual reconstruction parameter, the post processor will act as a low pass filter. When the post processor 10, however, receives a future but delayed quantized reconstruction parameter, which is possible in realtime applications using a certain delay, the post processor can perform an interpolation between the future and the present or a past quantized reconstruction parameter to for example smooth a time-course of a reconstruction parameter, for example for a certain frequency band.

Figure 7B:
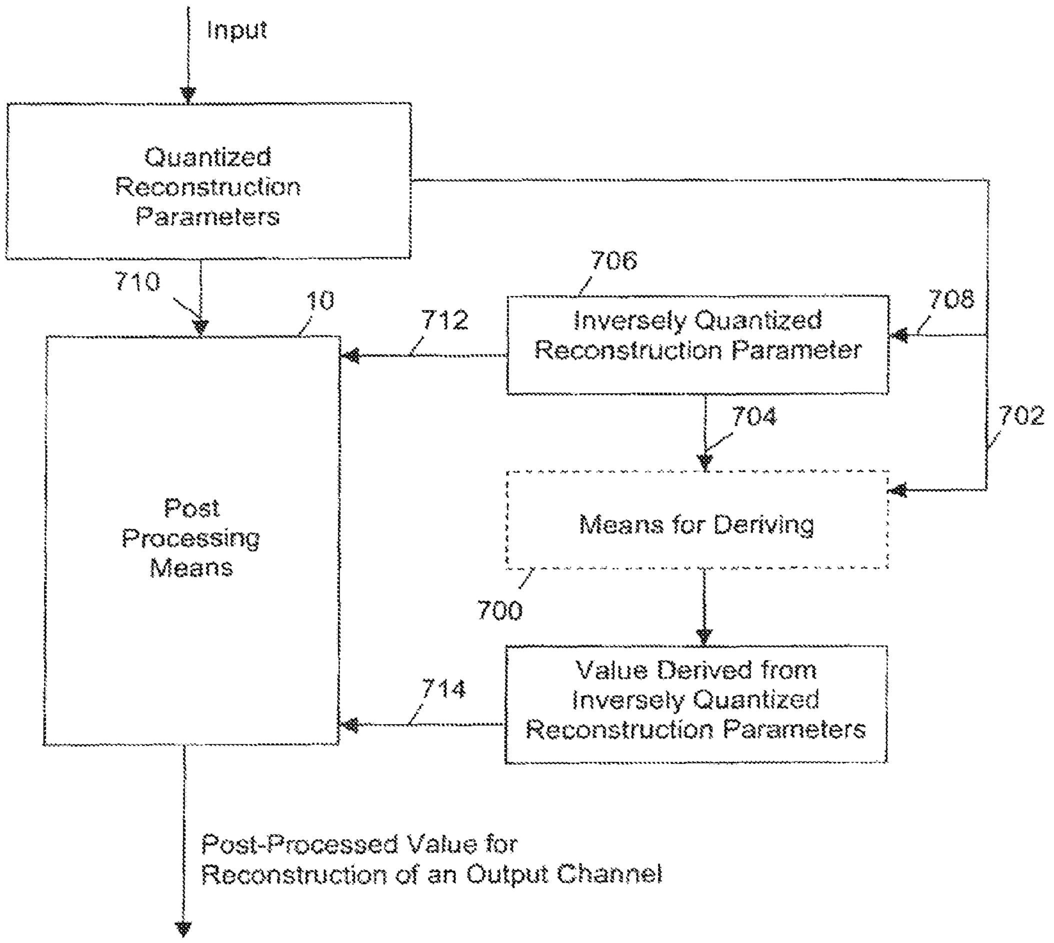
FIG. 7*b* is a schematic indication of the parameters to be post processed in accordance with the invention showing that also a quantity derived from the reconstruction parameter can be smoothed.

FIG. 7*b* shows an example implementation, in which the post processed value is not derived from the inversely quantized reconstruction parameter but from a value derived from the inversely quantized reconstruction parameter. The processing for deriving is performed by the means 700 for deriving which, in this case, can receive the quantized reconstruction parameter via line 702 or can receive an inversely quantized parameter via line 704. One could for example receive as a quantized parameter an amplitude value, which is used by the means for deriving for calculating an energy value. Then, it is this energy value which is subjected to the post processing (e.g. smoothing) operation. The quantized parameter is forwarded to block 706 via line 708. Thus, postprocessing can be performed using the quantized parameter directly as shown by line 710, or using the inversely quantized parameter as shown by line 712, or using the value derived from the inversely quantized parameter as shown by line 714.

As has been outlined above, the data manipulation to overcome artefacts due to quantization step sizes in a coarse quantization environment can also be performed on a quantity derived from the reconstruction parameter attached to the base channel in the parametrically encoded multi channel signal. When for example the quantized reconstruction parameter is a difference parameter (ICLD), this parameter can be inversely quantized without any modification. Then an absolute level value for an output channel can be derived and the inventive data manipulation is performed on the absolute value. This procedure also results in the inventive artefact reduction, as long as a data manipulation in the processing path between the quantized reconstruction parameter and the actual reconstruction is performed so that a value of the post processed reconstruction parameter or the post processed quantity is different from a value obtainable using requantization in accordance with the quantization rule, i.e. without manipulation to overcome the “step size limitation”.

Many mapping functions for deriving the eventually manipulated quantity from the quantized reconstruction parameter are devisable and used in the art, wherein these mapping functions include functions for uniquely mapping an input value to an output value in accordance with a mapping rule to obtain a non post processed quantity, which is then post processed to obtain the post-processed quantity used in the multi channel reconstruction (synthesis) algorithm.

Figure 8:
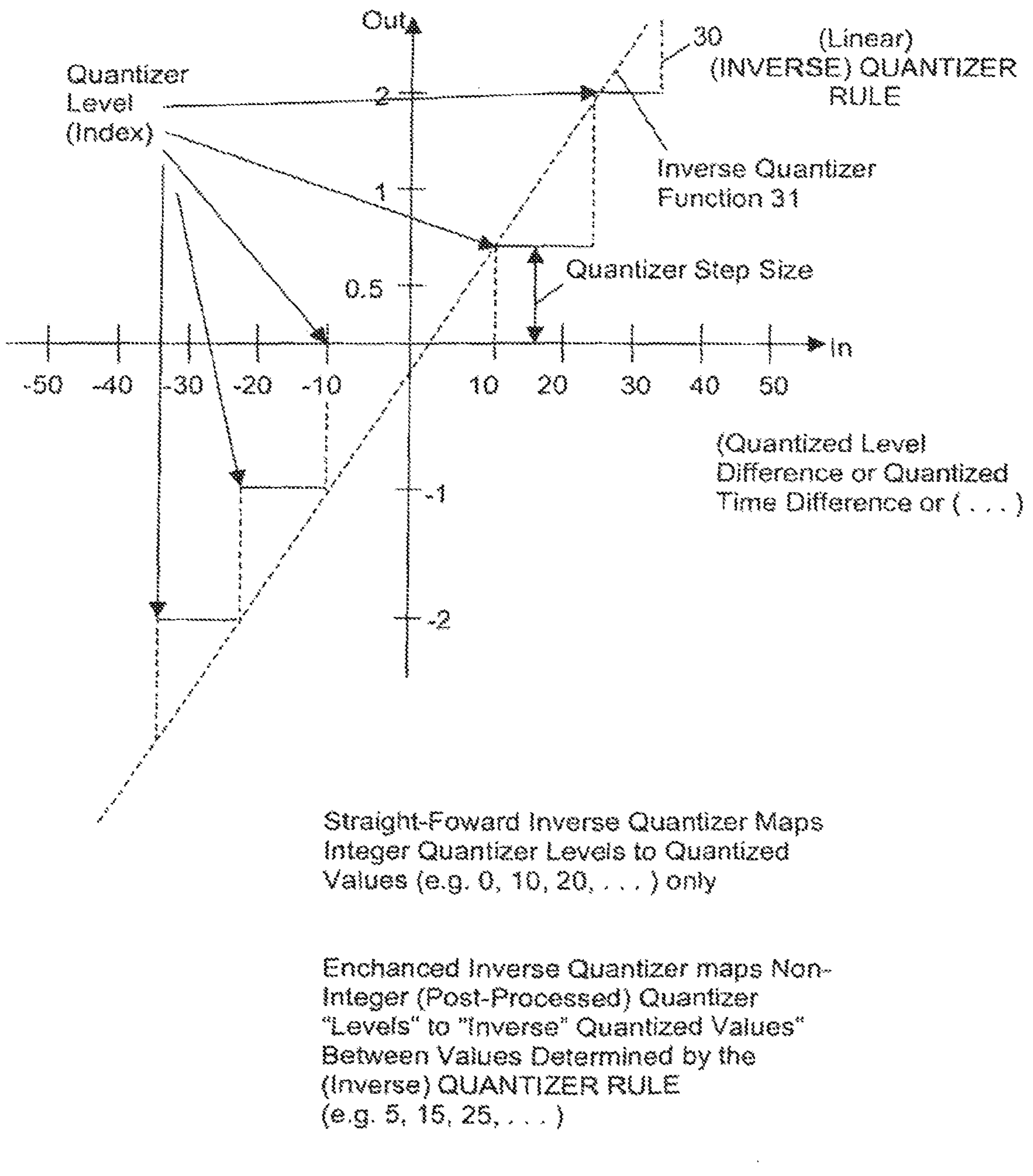
FIG. 8 is a schematic representation of a quantizer/inverse quantizer performing a straightforward mapping or an enhanced mapping.

In the following, reference is made to FIG. 8 to illustrate differences between an enhanced inverse quantizer 10*e* of FIG. 5 and a straightforward inverse quantizer 10*f* in FIG. 6*a*. To this end, the illustration in FIG. 8 shows, as a horizontal axis, an input value axis for non-quantized values. The vertical axis illustrates the quantizer levels or quantizer indices, which are preferably integers having a value of 0, 1, 2, 3. It has to be noted here that the quantizer in FIG. 8 will not result in any values between 0 and 1 or 1 and 2. Mapping to these quantizer levels is controlled by the stair-shaped function so that values between −10 and 10 for example are mapped to 0, while values between 10 and 20 are quantized to 1, etc.

A possible inverse quantizer function is to map a quantizer level of 0 to an inversely quantized value of 0. A quantizer level of 1 would be mapped to an inversely quantized value of 10. Analogously, a quantizer level of 2 would be mapped to an inversely quantized value of 20 for example. Requantization is, therefore, controlled by an inverse quantizer function indicated by reference number 31. It is to be noted that, for a straightforward inverse quantizer, only the crossing points of line 30 and line 31 are possible. This means that, for a straightforward inverse quantizer having an inverse quantizer rule of FIG. 8 only values of 0, 10, 20, 30 can be obtained by requantization.

This is different in the enhanced inverse quantizer 10*e*, since the enhanced inverse quantizer receives, as an input, values between 0 and 1 or 1 and 2 such as value 0.5. The advanced requantization of value 0.5 obtained by the manipulator 10*d* will result in an inversely quantized output value of 5, i.e., in a post processed reconstruction parameter which has a value which is different from a value obtainable by requantization in accordance with the quantization rule. While the normal quantization rule only allows values of 0 or 10, the preferred inverse quantizer working in accordance with the preferred quantizer function 31 results in a different value, i.e., the value of 5 as indicated in FIG. 8.

While the straight-forward inverse quantizer maps integer quantizer levels to quantized levels only, the enhanced inverse quantizer receives non-integer quantizer “levels” to map these values to “inversely quantized values” between the values determined by the inverse quantizer rule.

Figure 9A:
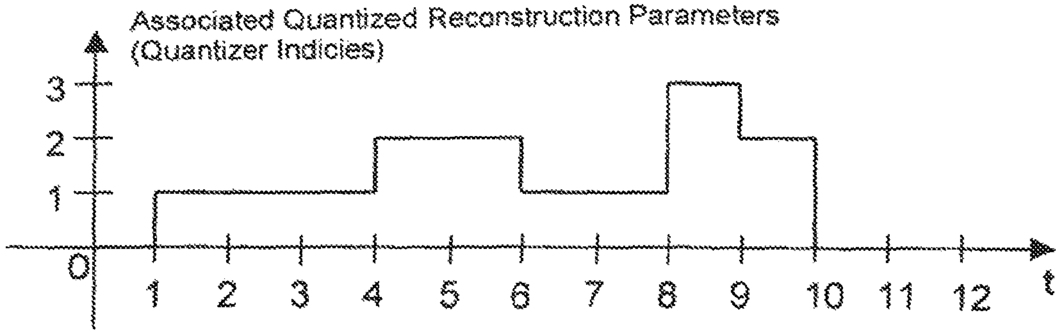
FIG. 9*a* is an exemplary time course of quantized reconstruction parameters associated with subsequent input signal portions.
Figure 9B:
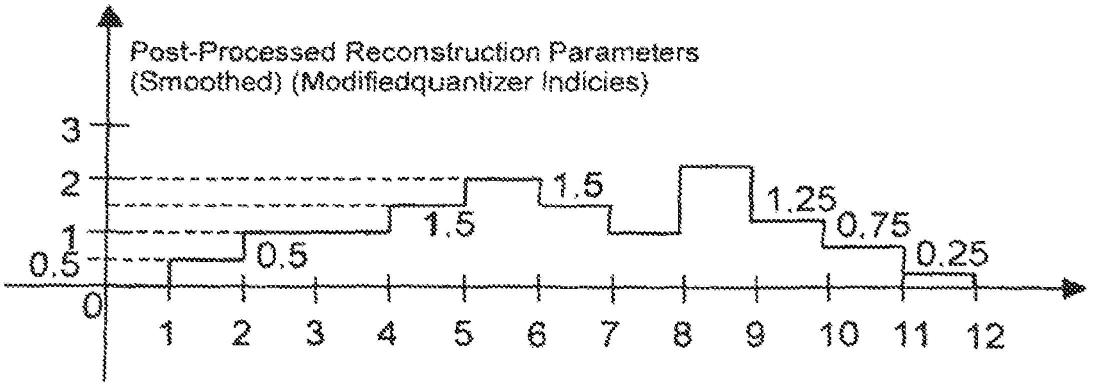
FIG. 9*b* is a time course of post processed reconstruction parameters, which have been post-processed by the post processor implementing a smoothing (low-pass) function.
Figure 10:
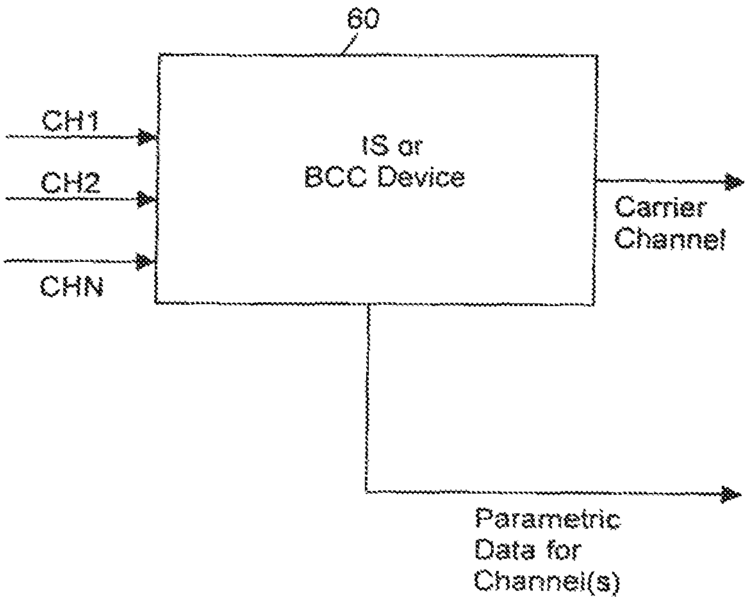
FIG. 10 PRIOR ART
FIG. 10 illustrates a prior art joint stereo encoder.

FIG. 9 shows the impact of the preferred post processing for the FIG. 5 embodiment. FIG. 9*a* shows a sequence of quantized reconstruction parameters varying between 0 and 3. FIG. 9*b* shows a sequence of post processed reconstruction parameters, which are also termed as “modified quantizer indices", when the wave form in FIG. 9*a* is input into a low pass (smoothing) filter. It is to be noted here that the increases/decreases at time instance 1, 4, 6, 8, 9, and 10 are reduced in the FIG. 9*b* embodiment. It is to be noted with emphasis that the peak between time instant 8 and time instant 9, which might be an artefact is damped by a whole quantization step. The damping of such extreme values can, however, be controlled by a degree of post processing in accordance with a quantitative tonality value as has been outlined above.

The present invention is advantageous in that the inventive post processing smoothes fluctuations or smoothes short extreme values. The situation especially arises in a case, in which signal portions from several input channels having a similar energy are super-positioned in a frequency band of a signal, i.e., the base channel or input signal channel. This frequency band is then, per time portion and depending on the instant situation mixed to the respective output channels in a highly fluctuating manner. From the psycho-acoustic point of view, it would, however, be better to smooth these fluctuations, since these fluctuations do not contribute substantially to a detection of a location of a source but affect the subjective listening impression in a negative manner.

In accordance with a preferred embodiment of the present invention, such audible artefacts are reduced or even eliminated without incurring any quality losses at a different place in the system or without requiring a higher resolution/quantization (and, thus, a higher data rate) of the transmitted reconstruction parameters. The present invention reaches this object by performing a signal-adaptive modification (smoothing) of the parameters without substantially influencing important spatial localization detection cues.

The sudden occurring changes in the characteristic of the reconstructed output signal result in audible artefacts in particular for audio signals having a highly constant stationary characteristic. This is the case with tonal signals. Therefore, it is important to provide a "smoother" transition between quantized reconstruction parameters for such signals. This can be obtained for example by smoothing, interpolation, etc.

Additionally, such a parameter value modification can introduce audible distortions for other audio signal types. This is the case for signals, which include fast fluctuations in their characteristic. Such a characteristic can be found in the transient part or attack of a percussive instrument. In this case, the embodiment provides for a deactivation of parameter smoothing.

This is obtained by post processing the transmitted quantized reconstruction parameters in a signal-adaptive way.

The adaptivity can be linear or non-linear. When the adaptivity is non-linear, a thresholding procedure as described in FIG. 3*c* is performed.

Another criterion for controlling the adaptivity is a determination of the stationarity of a signal characteristic. A certain form for determining the stationarity of a signal characteristic is the evaluation of the signal envelope or, in particular, the tonality of the signal. It is to be noted here that the tonality can be determined for the whole frequency range or, preferably, individually for different frequency bands of an audio signal.

This embodiment results in a reduction or even elimination of artefacts, which were, up to now, unavoidable, without incurring an increase of the required data rate for transmitting the parameter values.

As has been outlined above with respect to FIGS. 4*a* and 4*b*, the preferred embodiment of the present invention in the decoder control mode performs a smoothing of interchannel level differences, when the signal portion under consideration has a tonal characteristic. Interchannel level differences, which are calculated in an encoder and quantized in an encoder are sent to a decoder for experiencing a signal-adaptive smoothing operation. The adaptive component is a tonality determination in connection with a threshold determination, which switches on the filtering of interchannel level differences for tonal spectral components, and which switches off such post processing for noise-like and transient spectral components. In this embodiment, no additional side information of an encoder are required for performing adaptive smoothing algorithms.

It is to be noted here that the inventive post processing can also be used for other concepts of parametric encoding of multi-channel signals such as for parametric stereo, MP3 surround, and similar methods.

Figure 14:
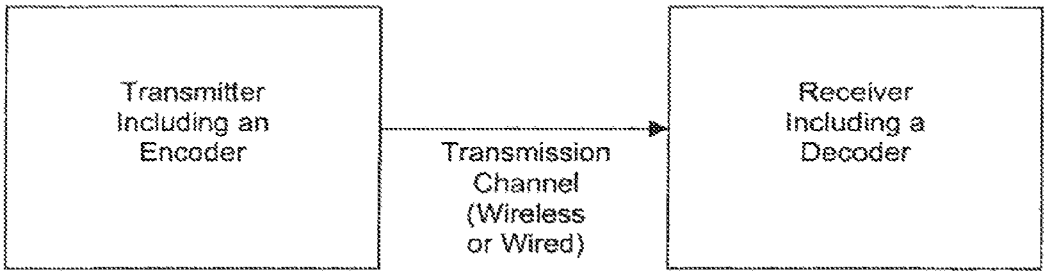
FIG. 14 a transmitter and a receiver of a transmission system.
Figure 15:
FIG. 15 an audio recorder having an inventive encoder and an audio player having a decoder.

The inventive methods or devices or computer programs can be implemented or included in several devices. FIG. 14 shows a transmission system having a transmitter including an inventive encoder and having a receiver including an inventive decoder. The transmission channel can be a wireless or wired channel. Furthermore, as shown in FIG. 15, the encoder can be included in an audio recorder or the decoder can be included in an audio player. Audio records from the audio recorder can be distributed to the audio player via the Internet or via a storage medium distributed using mail or courier resources or other possibilities for distributing storage media such as memory cards, CDs or DVDs.

Depending on certain implementation requirements of the inventive methods, the inventive methods can be implemented in hardware or in software. The implementation can be performed using a digital storage medium, in particular a disk or a CD having electronically readable control signals stored thereon, which can cooperate with a programmable computer system such that the inventive methods are performed. Generally, the present invention is, therefore, a computer program product with a program code stored on a machine-readable carrier, the program code being configured for performing at least one of the inventive methods, when the computer program products runs on a computer. In other words, the inventive methods are, therefore, a computer program having a program code for performing the inventive methods, when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. A spatial audio encoder, comprising:

an apparatus for generating a multi-channel synthesizer control signal, the apparatus including:

a signal analyzer for analyzing a multi-channel input signal;

a smoothing information calculator for determining smoothing control information in response to the signal analyzer, the smoothing information calculator being operative to determine the smoothing control information such that, in response to the smoothing control information, a synthesizer-side post-processor generates a post-processed reconstruction parameter or a post-processed quantity derived from the reconstruction parameter for a time portion of an input signal to be processed; and a data generator for generating a control signal representing the smoothing control information as the multi-channel synthesizer control signal;

a downmixer configured for generating a downmix signal from the multi-channel input signal; and a spatial parameter extraction device for extracting spatial parameters from the multi-channel input signal, wherein the spatial audio encoder is configured for transmitting or storing the downmix signal, the spatial parameters and the multi-channel synthesizer control signal.

2. The spatial audio encoder in accordance with claim 1, in which the signal analyzer is operative to analyze a change of a multi-channel signal characteristic from a first time portion of the multi-channel input signal to a later second time portion of the multi-channel input signal, and in which the smoothing information calculator is operative to determine a smoothing time constant information based on the analyzed change.

3. The spatial audio encoder in accordance with claim 2, in which the data generator is operative to generate, as the smoothing control information, a signal indicating a certain smoothing time constant value from a set of values known to the synthesizer-side post-processor.

4. Apparatus in accordance with claim 2, in which the signal analyzer is operative to determine whether a point source exists based on an inter-channel coherence parameter for a multi-channel input signal time portion, and in which the smoothing information calculator or the data generator are only active when the signal analyzer has determined that a point source exists.

5. The spatial audio encoder in accordance with claim 2, in which the signal analyzer is operative to generate an inter-channel level difference or inter-channel intensity difference for several time instants, and in which the smoothing information calculator is operative to calculate a smoothing time constant, which is inversely proportional to a slope of a curve of the inter-channel level difference or inter-channel intensity difference parameters.

6. The spatial audio encoder in accordance with claim 2, in which the smoothing information calculator is operative to calculate a single smoothing time constant for a group of several frequency bands, and in which the data generator is operative to indicate information for one or more bands in the group of several frequency bands, in which the synthesizer-side post-processor is to be deactivated.

7. The spatial audio encoder in accordance with claim 1, in which the data generator is operative to generate a synthesizer activation signal indicating whether the synthesizer-side post-processor is to work using information transmitted in a data stream or using information derived from synthesizer-side signal analysis.

8. The spatial audio encoder in accordance with claim 1, in which the smoothing information calculator is operative to calculate a change in a position of a point source for subsequent multi-channel input signal time portions, and in which the data generator is operative to output a control signal indicating that the change in position is below a predetermined threshold so that smoothing is to be applied by the synthesizer-side post-processor.

9. The spatial audio encoder in accordance with claim 1, in which the smoothing information calculator is operative to perform an analysis by synthesis processing.

10. The spatial audio encoder in accordance with claim 9, in which the smoothing information calculator is operative:

to calculate several time constants, to simulate a synthesizer-side post-processing using the several time constants, to select a time constant, which results in values for subsequent frames, which shows the smallest deviation from non-quantized corresponding values.

11. The spatial audio encoder in accordance with claim 9, in which different test pairs are generated, in which a test pair has a smoothing time constant and a certain quantization rule, and in which the smoothing information calculator is operative to select quantized values using a quantization rule and the smoothing time constant from the pair, which results in a smallest deviation between post-processed values and non-quantized corresponding values.

12. A spatial audio encoding method, comprising:

a method of generating a multi-channel synthesizer control signal, the method of generating a multi-channel synthesizer control signal, comprising:

analyzing a multi-channel input signal;

determining smoothing control information in response to the signal analyzing step, such that, in response to the smoothing control information, a post-processing step generates a post-processed reconstruction parameter or a post-processed quantity derived from the reconstruction parameter for a time portion of an input signal to be processed; and generating a control signal representing the smoothing control information as the multi-channel synthesizer control signal;

generating a downmix signal from the multi-channel input signal;

extracting spatial parameters from the multi-channel input signal; and transmitting or storing the downmix signal, the spatial parameters and the multi-channel synthesizer control signal.

13. A multi-channel synthesizer for generating an output signal from an input signal, the input signal having at least one input channel and a sequence of quantized reconstruction parameters and a multi-channel synthesizer control signal multiplexed with the sequence of quantized reconstruction parameters, the quantized reconstruction parameters being quantized in accordance with a quantization rule, and being associated with subsequent time portions of the input signal, the output signal having a number of synthesized output channels, and the number of synthesized output channels being greater than the number of input channels, comprising:

a control signal provider for providing the multi-channel synthesizer control signal having smoothing control information by demultiplexing the input signal, wherein the multi-channel synthesizer control signal representing the smoothing control information is associated to the at least one input channel;

a post-processor for determining, in response to the control signal, the post-processed reconstruction parameter or the post-processed quantity derived from the reconstruction parameter for a time portion of the input signal to be processed, wherein the post-processor is operative to determine the post-processed reconstruction parameter or the post-processed quantity such that the value of the post-processed reconstruction parameter or the post-processed quantity is different from a value obtainable using requantization in accordance with the quantization rule; and a multi-channel reconstructor for reconstructing a time portion of the number of synthesized output channels using the time portion of the input channel and the post-processed reconstruction parameter or the post-processed value.

14. The multi-channel synthesizer in accordance with claim 13, in which the control signal includes a decoder activation signal indicating, whether the post-processor is to work using the multi-channel synthesizer control signal multiplexed with the sequence of quantized reconstruction parameters or using information derived from a decoder-side signal analysis, and in which the post-processor is operative to work using the smoothing control information or based on a decoder-side signal analysis in response to the control signal.

15. The multi-channel synthesizer in accordance with claim 14, in which the smoothing control information indicates a smoothing time constant, and in which the post-processor is operative to perform a low-pass filtering, wherein a filter characteristic is set in response to the smoothing time constant.

16. The multi-channel synthesizer in accordance with claim 14, further comprising an input signal analyzer for analyzing the input signal to determine a signal characteristic of the time portion of the input signal to be processed, wherein the post-processor is operative to determine the post-processed reconstruction parameter depending on the signal characteristic, wherein the signal characteristic is a tonality characteristic or a transient characteristic of the portion of the input signal to be processed.

17. The multi-channel synthesizer in accordance with claim 13, in which the control signal includes smoothing control information for each band of a plurality of bands of the at least one input channel, and in which the post-processor is operative to perform post-processing in a band-wise manner in response to the control signal.

18. A method of generating an output signal from an input signal, the input signal having at least one input channel and a sequence of quantized reconstruction parameters and a multi-channel synthesizer control signal multiplexed with the sequence of quantized reconstruction parameters, the quantized reconstruction parameters being quantized in accordance with a quantization rule, and being associated with subsequent time portions of the input signal, the output signal having a number of synthesized output channels, and the number of synthesized output channels being greater than the number of input channels, comprising:

providing the multi-channel synthesizer control signal having the smoothing control information by demultiplexing the input signal, wherein the multi-channel synthesizer control signal representing the smoothing control information is associated to the at least one input channel;

determining, in response to the control signal, the post-processed reconstruction parameter or the post-processed quantity derived from the reconstruction parameter for a time portion of the input signal to be processed; and reconstructing a time portion of the number of synthesized output channels using the time portion of the input channel and the post-processed reconstruction parameter or the post-processed value.

19. A non-transitory storage medium having stored thereon a computer program for performing, when running on a computer, a spatial audio encoding method, comprising:

a method of generating a multi-channel synthesizer control signal, the method of generating a multi-channel synthesizer control signal comprising:

analyzing a multi-channel input signal;

determining smoothing control information in response to the signal analyzing step, such that, in response to the smoothing control information, a post-processing step generates a post-processed reconstruction parameter or a post-processed quantity derived from the reconstruction parameter for a time portion of an input signal to be processed; and generating a control signal representing the smoothing control information as the multi-channel synthesizer control signal;

generating a downmix signal from the multi-channel input signal;

extracting spatial parameters from the multi-channel input signal; and transmitting or storing the downmix signal, the spatial parameters and the multi-channel synthesizer control signal.

20. A non-transitory storage medium having stored thereon a computer program for performing, when running on a computer, a method of generating an output signal from an input signal, the input signal having at least one input channel and a sequence of quantized reconstruction parameters and a multi-channel synthesizer control signal multiplexed with the sequence of quantized reconstruction parameters, the quantized reconstruction parameters being quantized in accordance with a quantization rule, and being associated with subsequent time portions of the input signal, the output signal having a number of synthesized output channels, and the number of synthesized output channels being greater than the number of input channels, comprising:

providing the multi-channel synthesizer control signal having the smoothing control information by demultiplexing the input signal, wherein the multi-channel synthesizer control signal representing the smoothing control information is associated to the at least one input channel;

determining, in response to the control signal, the post-processed reconstruction parameter or the post-processed quantity derived from the reconstruction parameter for a time portion of the input signal to be processed; and reconstructing a time portion of the number of synthesized output channels using the time portion of the input channel and the post-processed reconstruction parameter or the post-processed value.

* * * * *